(12) United States Patent
Gomersall

(10) Patent No.: US 11,526,851 B1
(45) Date of Patent: *Dec. 13, 2022

(54) SYSTEMS AND METHODS FOR ASSET MANAGEMENT

(71) Applicant: Opal Labs Inc., Portland, OR (US)

(72) Inventor: Chris Gomersall, Atlanta, GA (US)

(73) Assignee: Opal Labs Inc., Portland, OR (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/165,848

(22) Filed: Feb. 2, 2021

Related U.S. Application Data

(63) Continuation of application No. 16/130,714, filed on Sep. 13, 2018, now Pat. No. 10,915,869, which is a continuation of application No. 14/252,520, filed on Apr. 14, 2014, now Pat. No. 10,121,123.

(60) Provisional application No. 61/812,111, filed on Apr. 15, 2013.

(51) Int. Cl.
*G06Q 10/10* (2012.01)
*G06Q 10/06* (2012.01)
*G06F 17/00* (2019.01)

(52) U.S. Cl.
CPC ......... *G06Q 10/1093* (2013.01); *G06F 17/00* (2013.01); *G06Q 10/063* (2013.01)

(58) Field of Classification Search
CPC ... G06F 17/00; G06Q 10/063; G06Q 10/1093
See application file for complete search history.

(56) References Cited

U.S. PATENT DOCUMENTS

| | | | | |
|---|---|---|---|---|
| 7,636,733 B1 * | 12/2009 | Rothmuller | ......... | G06F 16/9577 707/E17.121 |
| 2005/0222971 A1 * | 10/2005 | Cary | ................... | G06Q 10/109 |
| 2007/0143669 A1 * | 6/2007 | Royer | ................ | G06F 16/9577 707/E17.121 |
| 2008/0186807 A1 * | 8/2008 | Jain | ....................... | G04G 11/00 368/10 |
| 2012/0026381 A1 * | 2/2012 | Lee | .................. | H04N 5/232127 348/333.12 |
| 2012/0167047 A1 * | 6/2012 | Wyler | .............. | H04N 5/232127 348/333.12 |
| 2013/0169644 A1 * | 7/2013 | Bolton | ................... | G04G 11/00 368/10 |
| 2014/0067702 A1 * | 3/2014 | Rathod | ................. | G06Q 50/01 705/319 |

OTHER PUBLICATIONS

"Visualization Techniques for Schedule Comparison", by Dandan Huang, Department of Computer Science, University of Victoria, 2009. (Year: 2009).*

(Continued)

*Primary Examiner* — Pan G Choy
(74) *Attorney, Agent, or Firm* — Renaissance IP Law Group, LLP; David A. Crowther

(57) ABSTRACT

Systems and methods described herein may involve receiving creative elements, each creative element comprising a visual element and a time. Each of the plurality of creative elements may overlap in time with each other. The visual elements of the associated creative elements may be displayed together in a time slot of a calendar corresponding to the overlapping time.

9 Claims, 34 Drawing Sheets

(56) References Cited

OTHER PUBLICATIONS

"Visualization of Calendar Data", by Philipp Hartl, Institute of Computer Graphics and Algorithms, Vienna University of Technology, INFORMATIK, Oct. 27, 2008. (Year: 2008).*
Theresa Regli, "The State of Digital Asset Management", KM World 17.10: 8-9. Information Today, Inc. (Nov./Dec. 2008) (Year: 2008).*
Kim et al., "Enterprise Digital Asset Management System", Information Technology and Libraries 26.4: 4-16. American Library Associatioin. (Dec. 2007) (Year: 2007).*
Tchai Tavor, "Online Advertising Development and Their Economic Effectiveness", Department of Economocs, Emek Yezreel Academic College. Australian Journal of Business and Management Research vol. 1 No. 6 [121-133]. Sep. 2011. (Year: 2011).*

\* cited by examiner

User Settings                                                                     ✕

My Account         1520

| Photo Here | First Name | Last Name |
| | John | Doe |
| | Company | Job Title |
| 📎 Upload photo | Pixel Bakery | CEO |

E-mail Adress
hello@dusko.sk

Phone Number
779 004 842    ◁ Wrong phone number!

City              Country
Prague          Czech Republic ▷

Language        Time Zone
English ▷       +1 GMT, Prague, Vienna,... ▷

Notification Settings
☑ Email me when I'm added to campaign
☑ Add a notification when creative is added
☑ Add a notification when creative is modified f Connect to Facebook Be sure to save all changes you just made!    Update settings

Active Campaigns
A-Z   By Date

Coca Cola Christmas Campaign
Jameson Winter Surprise
Who's the new face of Ford?
VW campaign - boosting fan base   📹 📢
Dusko.sk promo campaign ➔ Show archived campaigns

My Templates
A-Z   By Date

Coca Cola Christmas Campaign
Jameson Winter Surprise
Who's the new face of Ford?
VW campaign - boosting fan base   ✏️

SYSTEMS AND METHODS FOR ASSET MANAGEMENT

CROSS-REFERENCE TO RELATED APPLICATIONS

This application is a continuation of U.S. patent application Ser. No. 16/130,714, filed Sep. 13, 2018, which is a continuation of U.S. patent application Ser. No. 14/252,520, filed Apr. 14, 2014, which claims the benefit of U.S. Provisional Patent Application No. 61/812,111, filed Apr. 15, 2013, all of the forgoing of which are incorporated by reference in their entireties.

BRIEF DESCRIPTIONS OF THE DRAWINGS

FIGS. 14A-14I are calendar screenshots according to an embodiment of the invention.

FIGS. 15A-15H are user interface screenshots according to an embodiment of the invention.

DETAILED DESCRIPTION OF SEVERAL EMBODIMENTS

Figure 1:
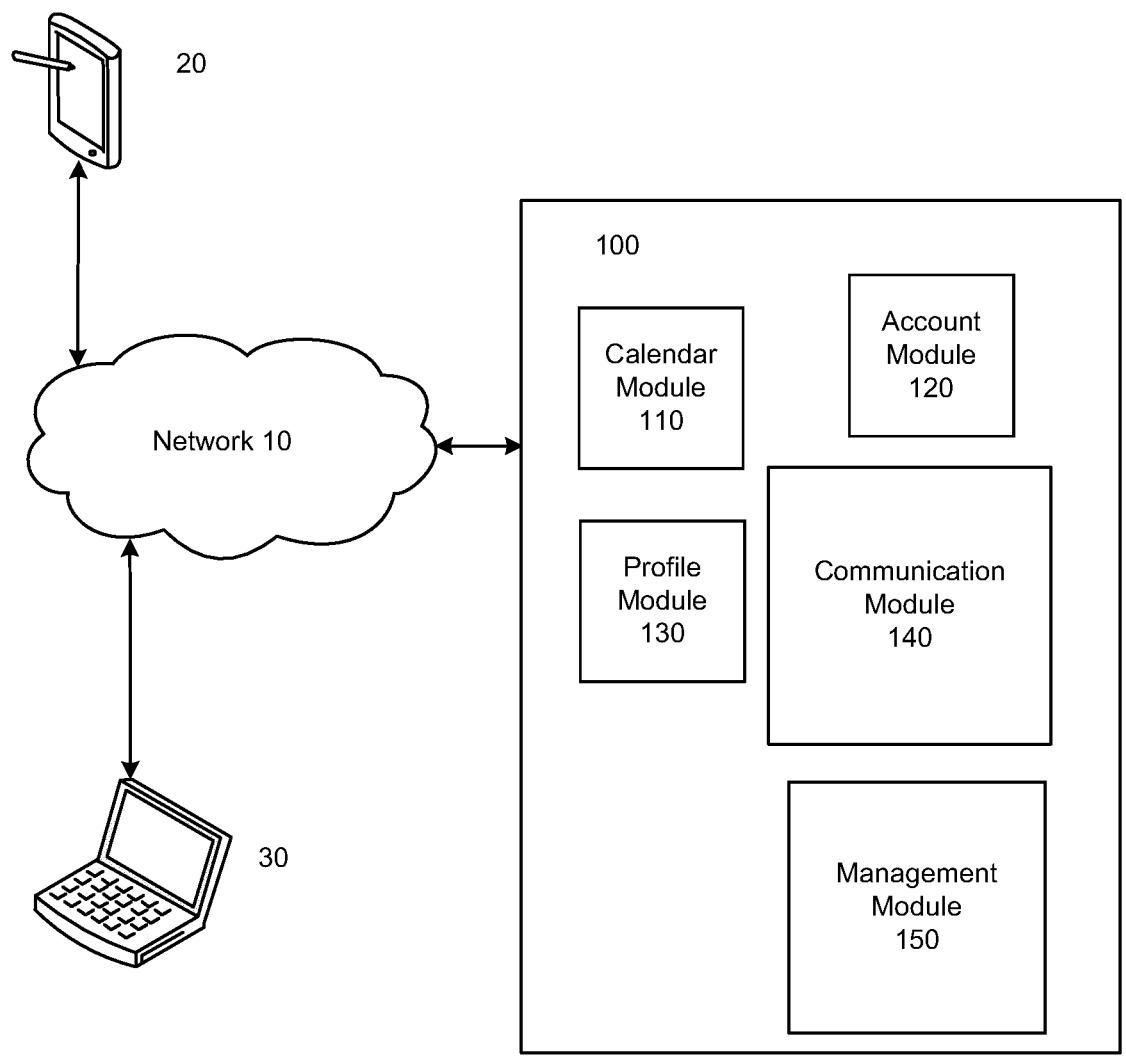
FIG. 1 is a system according to an embodiment of the invention.

Systems and methods described herein may provide applications for creating, reviewing, and managing publishing/messaging/content calendars. Marketing, creative, and production teams may have access to multiple visual assets (advertising formats, photography, designs, sketches, videos, art, paintings, fabric, blueprints, mockups, drawings, automotive concepts, clothing designs, industrial designs, architectural drawings, handwriting, source files, posters, facial representations, projections, etc.) simultaneously displayed in one place, may be able to see how each piece of creative visually relates to the other, and may be able to also visually see data related to the use of the visual assets, such as performance data, metrics, analytics, and spending. For example, a user may be able to get a quick snap shot of how the media dollars are being spent against each asset along with performance data, metrics, and analytics. Some performance data may include views/impressions/reach, clicks, hits, sharing of the ad with others, engagement (e.g., likes or comments on a social network or other forum), etc. An example use case is advertising and marketing: by visually layering digital marketing calendars (e.g., social media, display ads, search, media spend, etc.), traditional marketing calendars (e.g., out of home, television, print, radio, etc.), important dates, and media spend/performance data, the marketing manager can get a better sense of how the entire advertising initiative is working as a whole. For example, the systems and methods described herein may provide some or all of this information in a one-screen, horizontal, printable, timeline format. Other formats may also be possible. Other use cases may include art galleries planning displays and schedules, military organizations planning equipment deployment for different seasons, clothing lines being sold seasonally, retailers planning sales and seasonal store displays, etc.

Systems and methods described herein may digitally deliver high-quality text, imagery, audio, and video content related to marketing and advertising in an easy-to-navigate visual calendar. Publishing, messaging, and content calendars may be delivered to any cloud-based device such as a PC, smartphone, or tablet computer. Various subscription models for users, for example which may be based on number of users, may be employed in some embodiments. Systems and methods described herein may allow a user to visually see how simultaneous campaigns relate to each other from a visual standpoint; get a quick snapshot of how creative cadence (e.g., timing of creative release) relates to media spend; collaborate across agencies, brands, and platforms on present and future campaign messaging; compare multiple campaigns and campaign elements in a layered environment; utilize preloaded templates to see how other brands and agencies have succeeded, etc.

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. For example, although the term "router" may appear in the following specification, the disclosed embodiments are not limited to routers.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connection). Connections between computers may use any protocols, including connection oriented protocols such as TCP or connectionless protocols such as UDP. Any connection through which at least two computers may exchange data can be the basis of a network.

FIG. 1 is a system 100 according to an embodiment of the invention. The system 100 may include one or more computers comprising one or more processors. The system 100 may include a calendar module 110 which may be constructed and arranged to generate and manage the calendars 1400 described in greater detail below. The system 100 may include an account module 120 and/or profile module 130 which may be constructed and arranged to generate and manage accounts and/or profiles, respectively, as described in greater detail below. The system 100 may also include a communication module 140, which may allow the system 100 to interact with other computers, e.g. via a network such as the Internet, so that the system 100 may send and receive data associated with calendars 1400 to remote computers. The system 100 may also include a management module 150, which may manage features of the system 100. For example, the system 100 may be in communication with remote computers 20, 30 via a network 10 such as the Internet.

The system 100 may provide access to users based on user class in some embodiments. Example user classes may be as follows. A Subscriber may be someone who has created an account and has a base subscription or a free trial subscription. A Potential Subscriber may be someone who has not yet created an account for a base subscription. Potential Subscribers may be exposed to the system 100 by any of a variety of methods, for example through free trial subscriptions offered through sales efforts or through an invitation from a Subscriber to be a collaborating member in a campaign and to subscribe to the system 100. A Collaborator may be a Subscriber with a base subscription that hosts or joins a campaign. An Editor may be any Subscriber that can edit a campaign and manage campaign members. Any Subscriber that hosts/starts a campaign may automatically be an Editor. Editors may be able to turn Collaborators into Editors. A Marketing Administrator may identify promotional codes used by individuals (e.g., by Facebook preferred marketing developer program (PMD) users) for trial memberships. The Marketing Administrator role may run reports to analyze promotional code origins and effectiveness. A Curator may manage a content repository and determine which example campaigns and templates will be edited/removed/added. A System User may manage the background system 100 (e.g., the database, content delivery mechanism, integration with the payment processing) and the Subscriber-facing app and web site. A Customer Support User may be an associate who is accessible (e.g., by phone or email) to assist a Subscriber with their account.

At least a base subscription may be necessary before the system 100 content can be accessed in some embodiments. Only Subscribers with accounts may be permitted to search for content and view content beyond the initial landing page. Non-Subscribers may be able to view (via the initial landing page) information about the system 100, a system 100 demo, and a form to create a system 100 account. Trial subscriptions may be initiated externally (e.g., by Facebook PMDs) or internally from within the system 100. The trial subscription may begin when the Potential Subscriber completes the account registration to activate the account. The duration of the trial may vary, e.g. based on the PMD from which the subscription promotion originates. In some embodiments a Potential Subscriber can access a link in an email which may launch an account creation page and identify the PMD who originated the promotion. The system 100 may offer a free trial subscription and may allow self-service enrollment.

Figure 2:
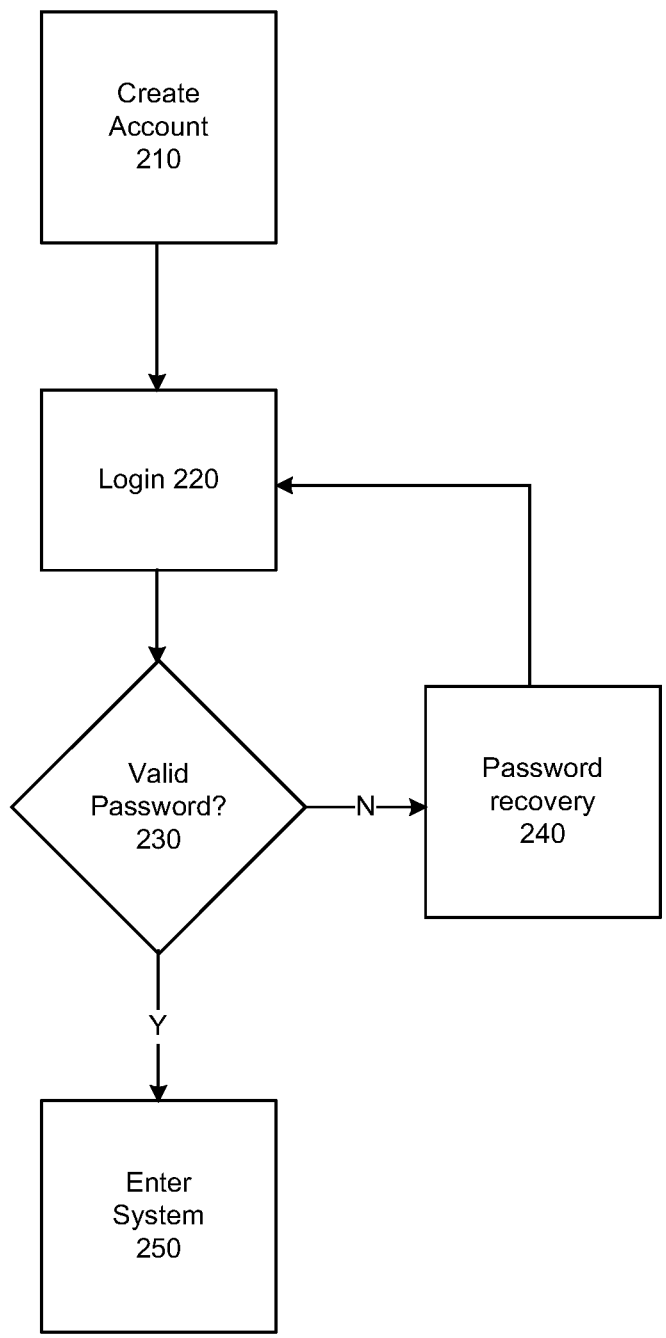
FIG. 2 is an account creation process according to an embodiment of the invention.

FIG. 2 is an account creation process 200 according to an embodiment of the invention. A Potential Subscriber may access an interface provided by the system 100 (e.g., by the account module 120), for example via an email from a PMD, or by downloading an app to their wireless device, or accessing the system 100 web site. In 210, the Potential Subscriber may access a form for creating a new account. The Potential Subscriber may provide information to create an account. Example information may include a unique email address which may serve as an account identifier in some embodiments, a password which may be required to meet strong password requirements in some embodiments, a name, identity challenge questions and answers, an alert preference (e.g., push notification, email, none), a terms of use agreement acceptance, a query response for a minimum age to use the site, a payment method such as credit card information, an auto-renew subscription preference (e.g., yes/no and duration), and/or other information.

Figure 13A:
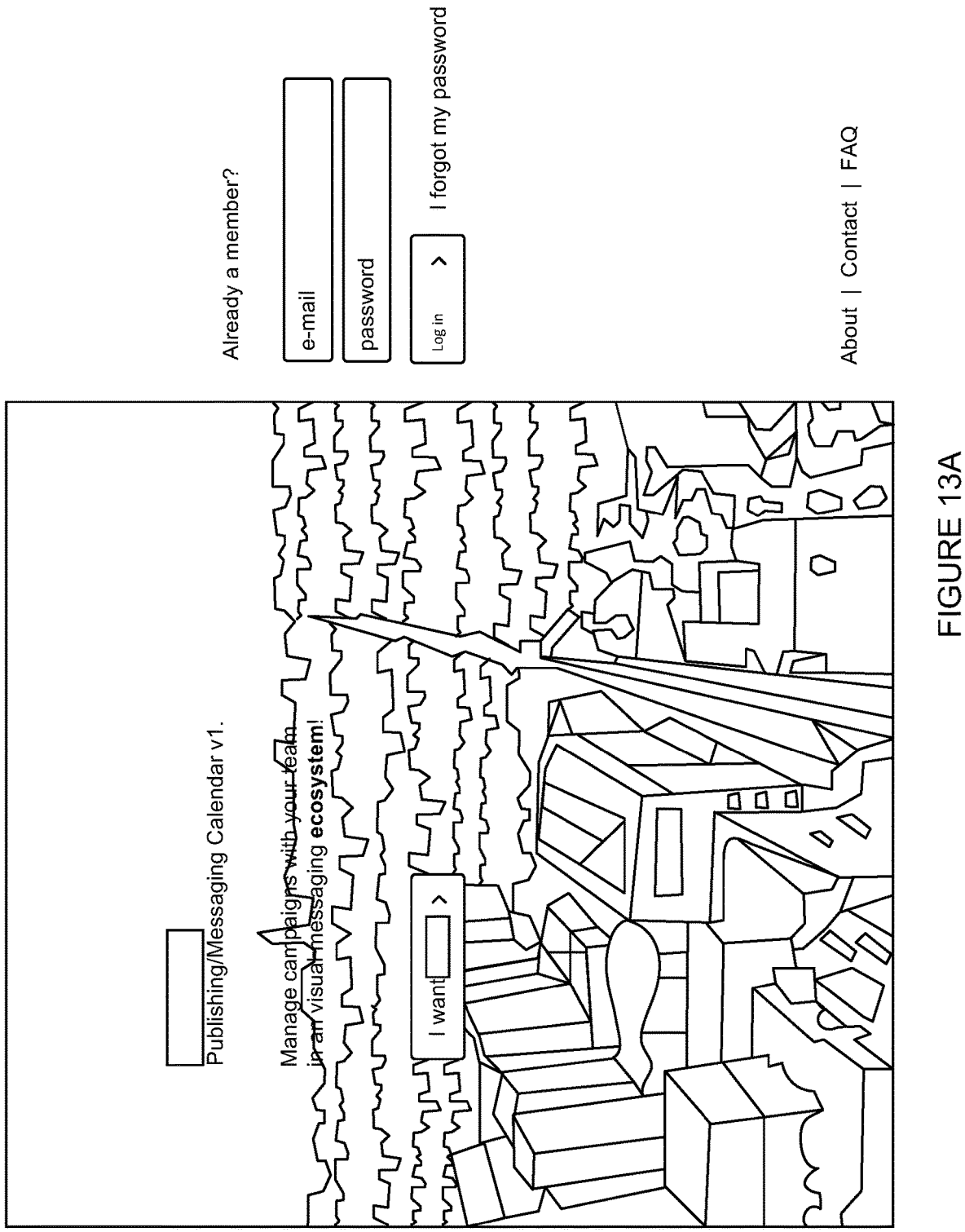
FIGS. 13A-13D are login screenshots according to an embodiment of the invention.
Figure 13B:
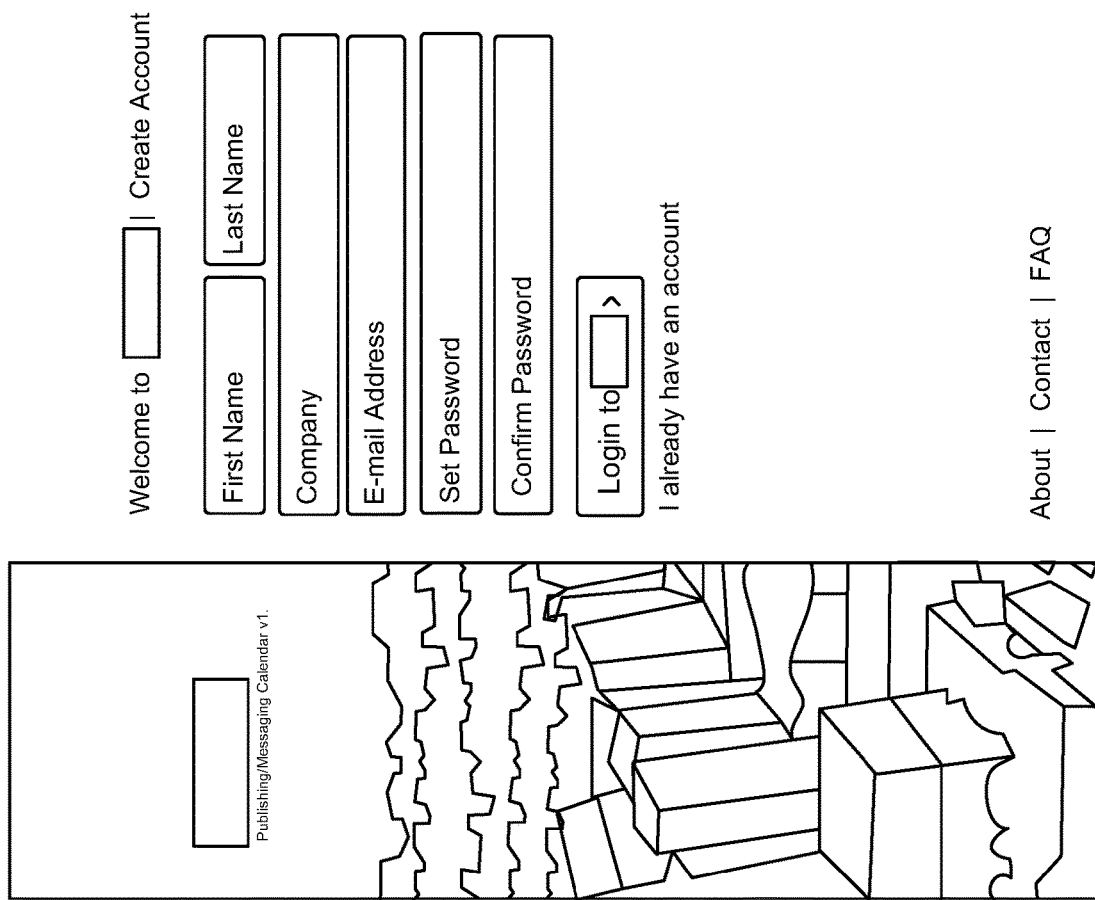

FIG. 13B is an example account creation page according to an embodiment of the invention, through which a user may create an account. Once an account is created, the Potential Subscriber may be a Subscriber. In 220 the Subscriber may login, for example by entering their account identifier and password. Note that in some embodiments, an account may be associated with a client or group of related calendars. For example, the account creation page may be used to create a new account for a specific company. Some users may be account admins and they may have access to an account creation page and/or other account pages (see for example FIG. 15G below, which is an account page associated with a brand).

Figure 13C:
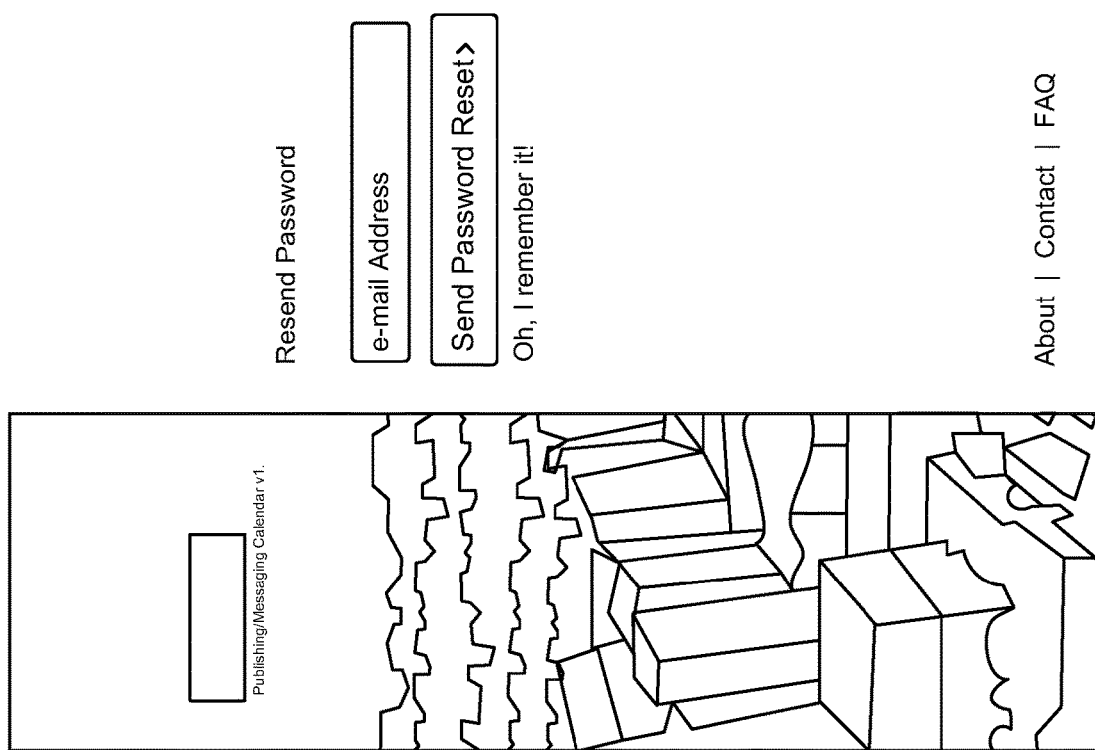
Figure 13D:
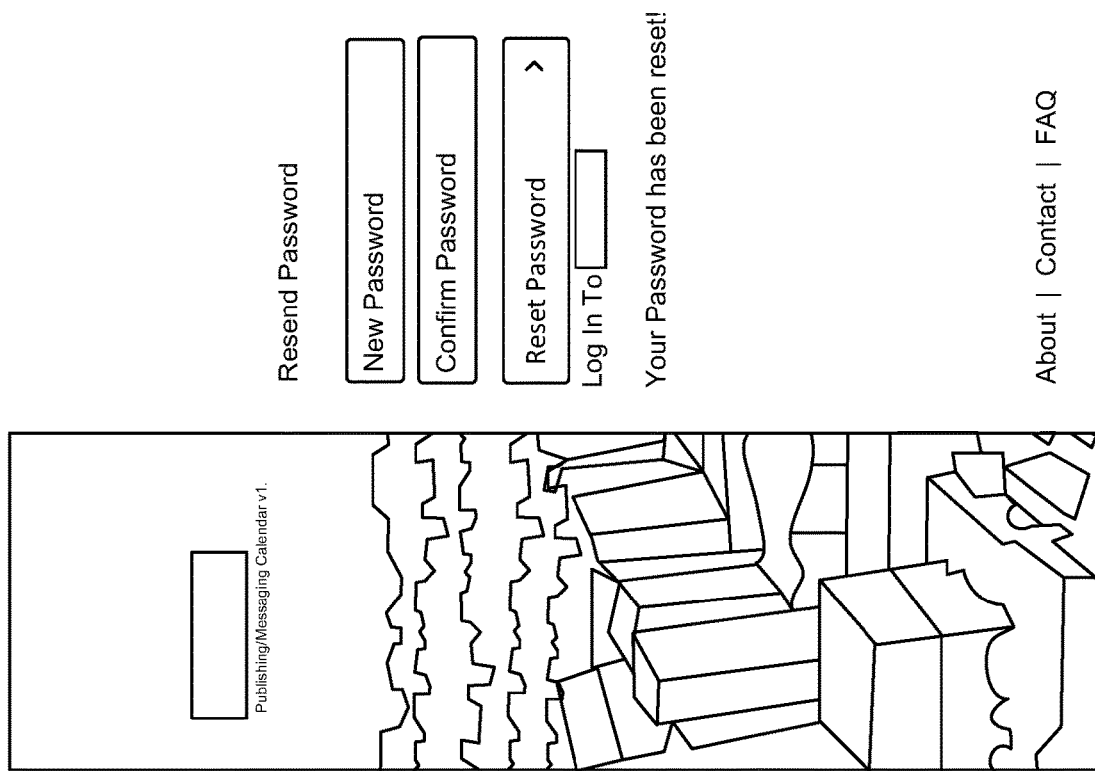

FIG. 13A is an example login page according to an embodiment of the invention, through which a user may enter credentials to access the system 100. The login page may allow any user to log into their profile (e.g., by the profile module 130). Users who are account admins may be able to access account pages as well, but other users may only be able to access profile pages and calendar pages (see for example FIG. 15F below, which is a profile page associated with a user). In 230 the system 100 may determine whether the password is valid. If not, in 240 password recovery may be offered and performed. FIG. 13C is an example password resend page according to an embodiment of the invention, through which a user may enter an email address to which a password reset link may be sent. FIG. 13D is an example password reset page according to an embodiment of the invention, through which a user may enter a new password after receiving the link. If so, in 250 access to the system 100 features described below may be granted. Upon login, a landing page associated with the Subscriber may be displayed. The content of the landing page may vary by Subscriber and may contain main calendar (described below) and options to manage the account profile (e.g., change information entered during registration), for example.

FIGS. 14A-14I and 16 are calendar screenshots according to an embodiment of the invention. FIGS. 15A-15H are user interface (UI) screenshots according to an embodiment of the invention. The system 100 may display and allow interaction with campaign data via a calendar 1400 UI and/or other user interfaces. The calendar 1400 and associated functions may be generated and/or managed by the calendar module 110 in some embodiments. The system 100 may receive user commands and/or send data to users locally or remotely using the communication module 140 in some embodiments.

Figure 14A:
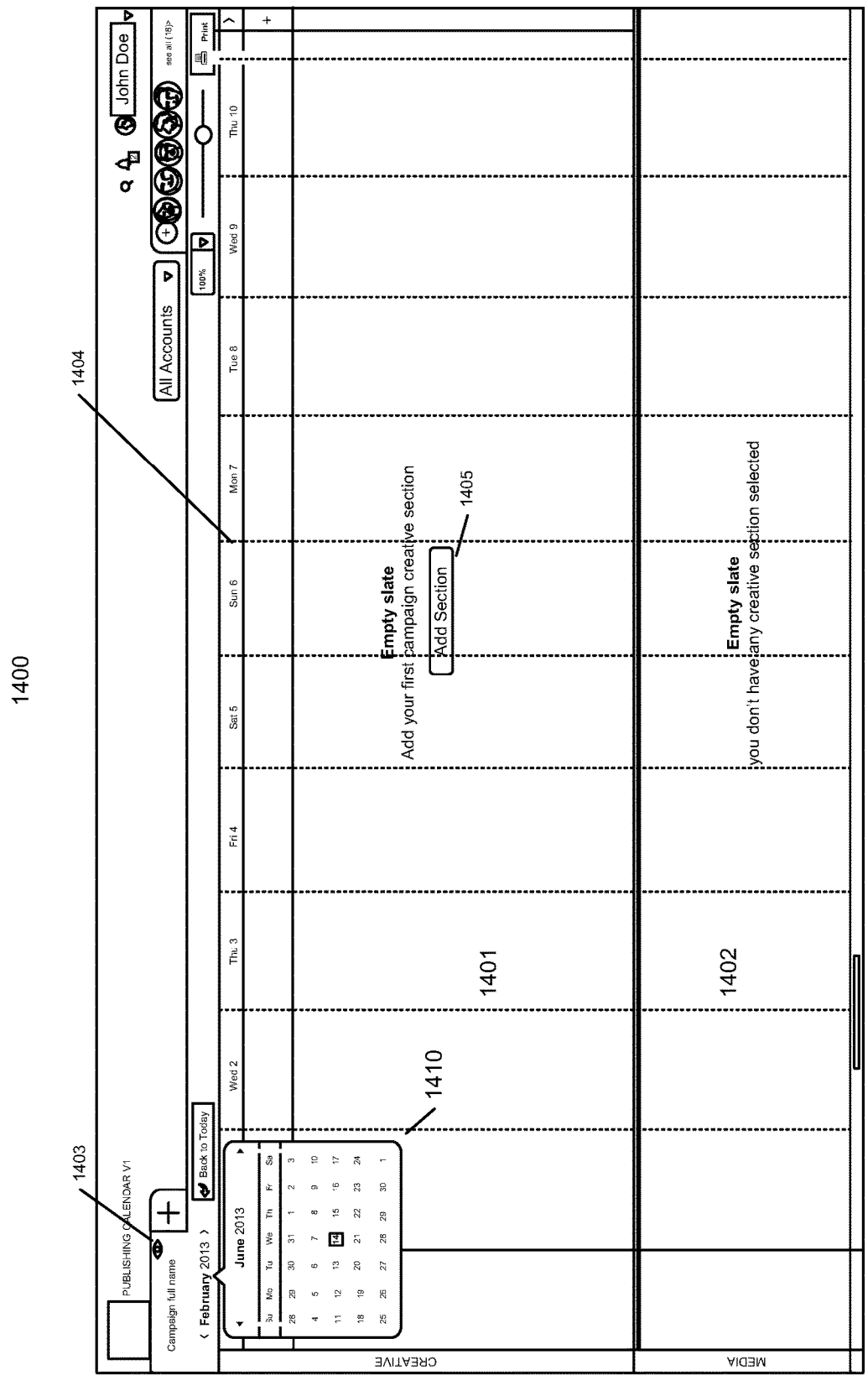

The calendar 1400 in FIG. 14A is a calendar with no creative data entered for the time range displayed. The calendar 1400 UI may allow users to add creative data 1405 and may allow users to select a different time range to view 1410 (e.g., navigate to different times by selecting a date). Creative data may be displayed in the creative section 1401, and media data associated with the creative data may be displayed in the media section 1402, as described in greater detail below. For example, creative data may include information about a specific campaign (e.g., campaign creative elements, description, locations where displayed, etc.), and media data may include spend data, performance metric data, etc. Multiple campaigns may be displayed in a calendar display for date selection 1410, and each campaign may be selected via a tab 1403 (the example of FIG. 14A shows only one campaign). The calendar 1400 may display dates 1404 which may be populated with creative and/or media data for days during which a campaign runs, as discussed in greater detail below. Calendars 1400 in the examples herein are used for displaying creatives (e.g., advertising campaigns associated with various products, product lines, clients, etc.), although they may be used to display any data with associated date information (e.g., data about products, assets, options, etc.).

Figure 14B:
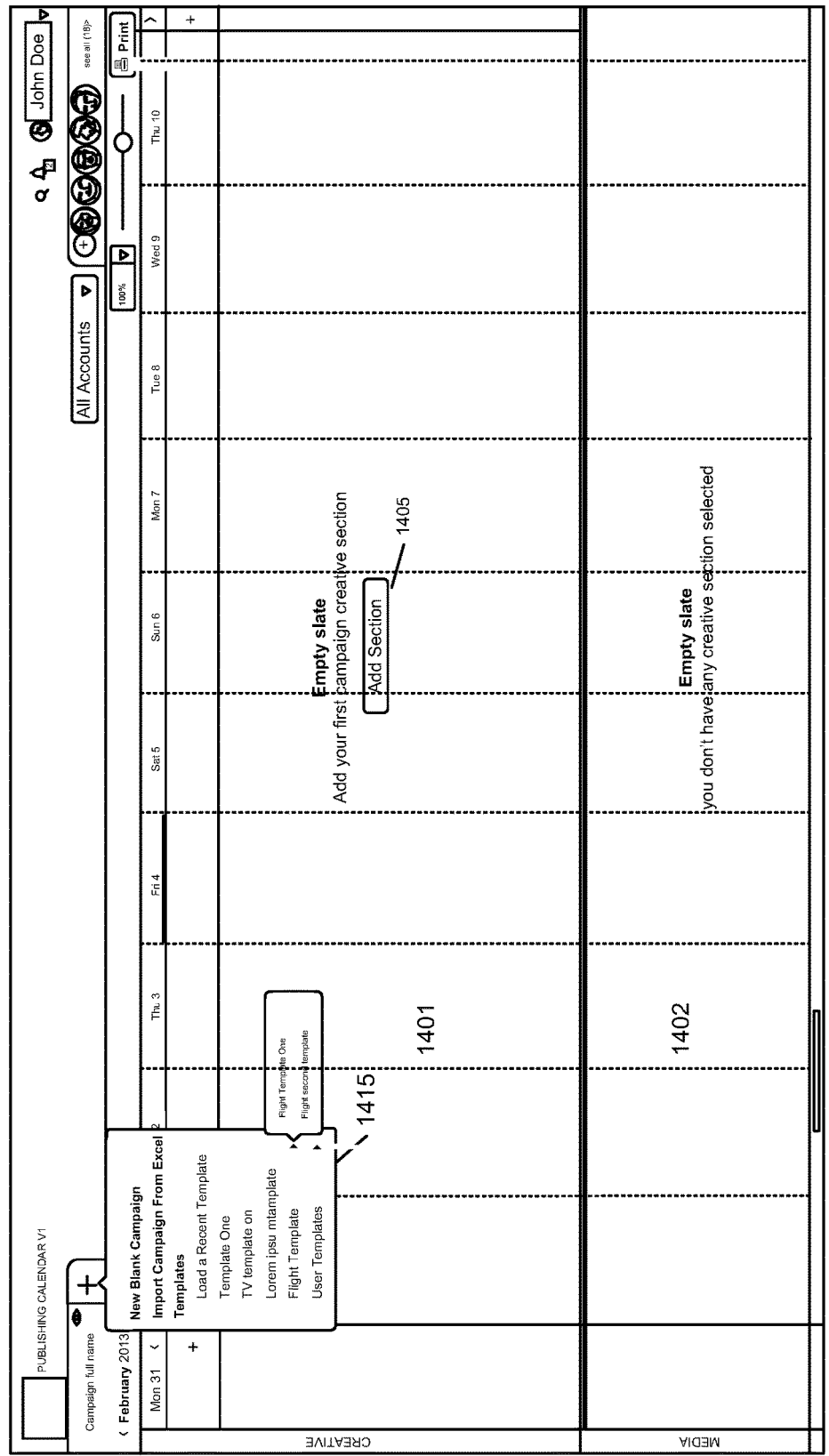
Figure 16:
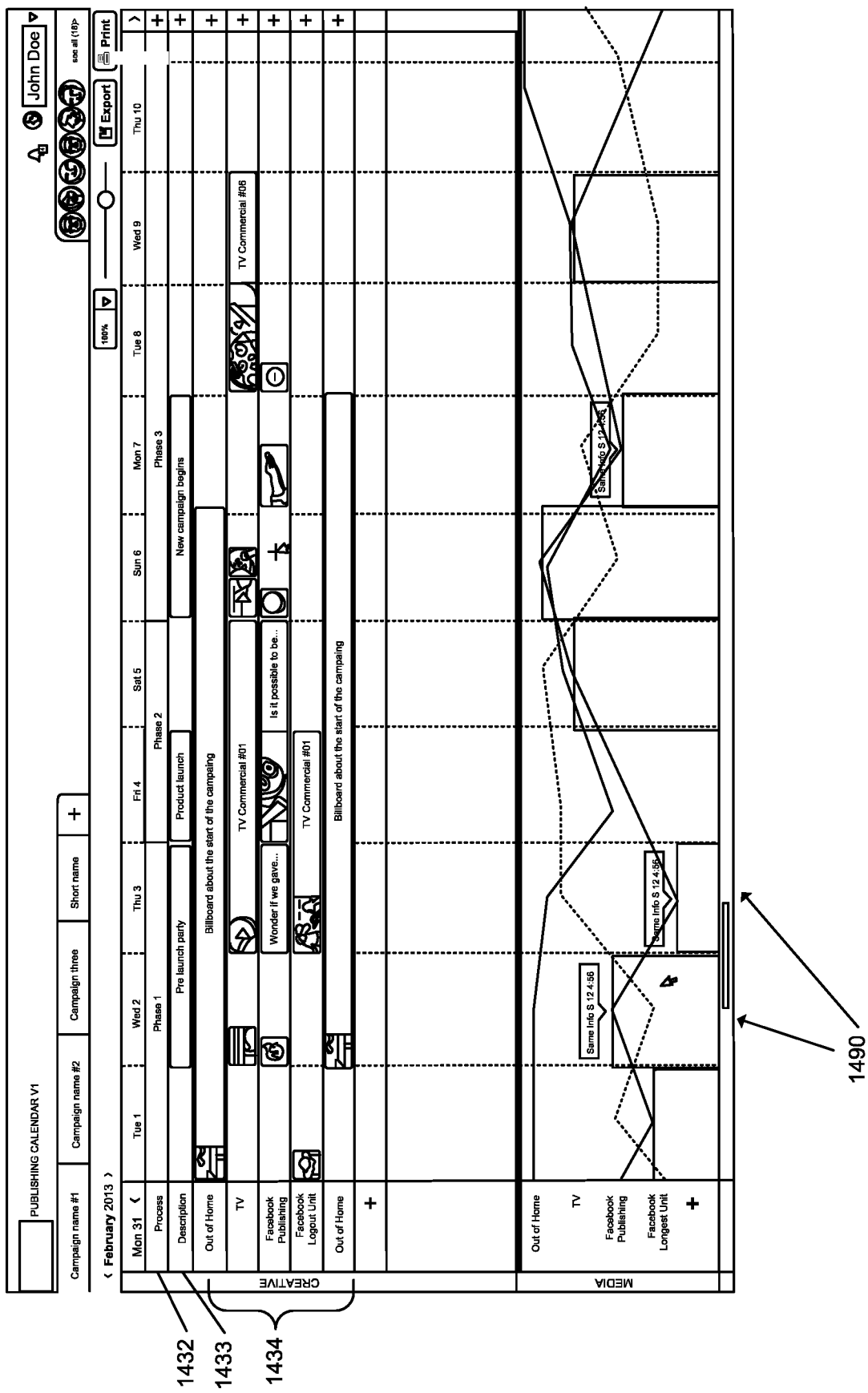
FIG. 16 is a calendar screenshot according to an embodiment of the invention.

As shown in FIG. 14B, the calendar 1400 UI may allow users to create new blank campaigns, import campaigns, and/or use templates to create campaigns 1415. Templates may enable users to start with content in the calendar 1400, rather than opening a blank document and starting from scratch. For example, recent templates (e.g., "Template One", "TV template on", "Lorem ipsum template") may be shown in the menu. Some templates may be supplied with the calendar 1400 UI (e.g., "Flight Templates"). Other templates may be created by users (e.g., "User Templates"). FIG. 16 illustrates an example calendar 1400 which may be used as a template in some embodiments. The calendar 1400 of FIG. 16 includes creative and media data. A user may have generated the calendar 1400 of FIG. 16 and then saved it as a template. As a result, the user may be able to load it as a template in the future and start working on a calendar 1400 which is prepopulated with creative and media data.

Figure 14C:
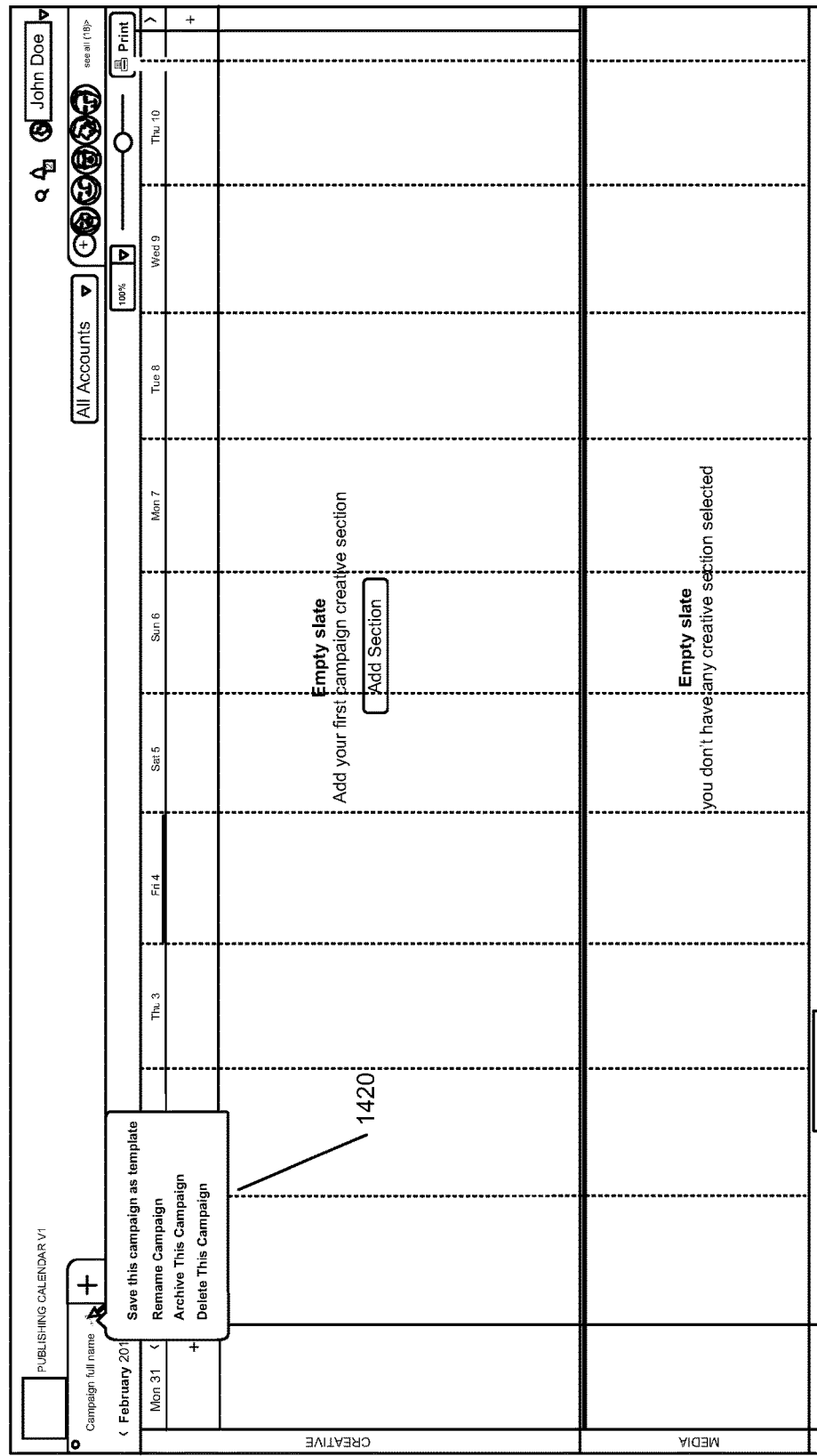

As shown in FIG. 14C, the calendar 1400 UI may allow users to save campaigns as templates, rename campaigns, archive campaigns, and/or delete campaigns 1415.

Figure 14D:
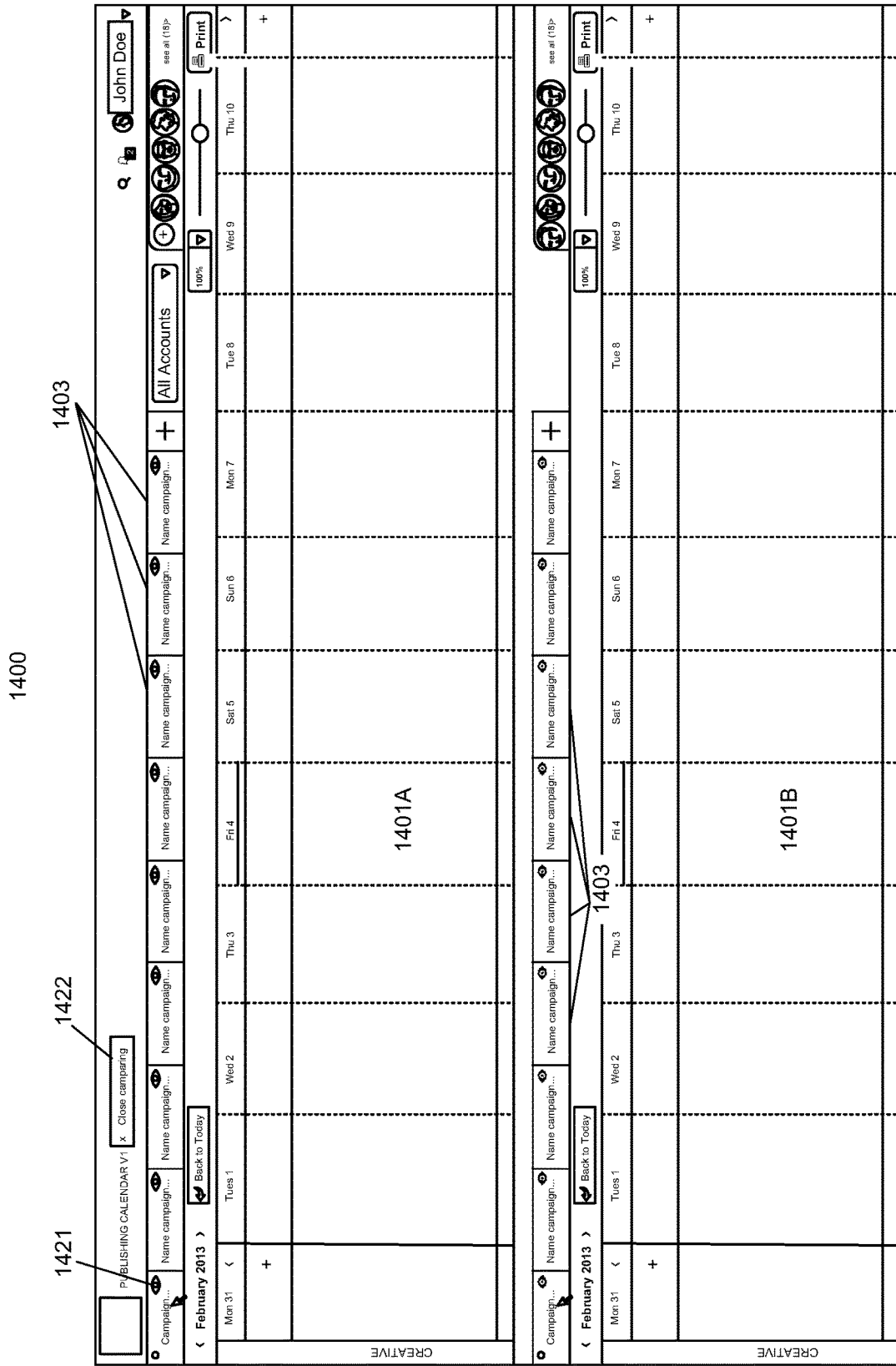

FIG. 14D shows an example wherein the calendar 1400 UI displays two creative sections 1401A and 1401B simultaneously. An option may be provided within the UI to compare creatives. For example, an icon 1421 may be provided in a tab 1403 above a first creative section 1401A, and selecting this icon 1421 may cause the creative associated with the tab 1403 to be displayed in a second creative section 1401B. Selecting the icon 1421 again may stop the comparison. An option to stop comparing 1422 may also be provided in the UI. The comparison may allow a user to view separate calendars/campaigns together to see what campaigns are running in the same date range, for instance. In the example of 14D, two creative sections are compared, although in other embodiments more creative sections may be displayed simultaneously.

Figure 14E:
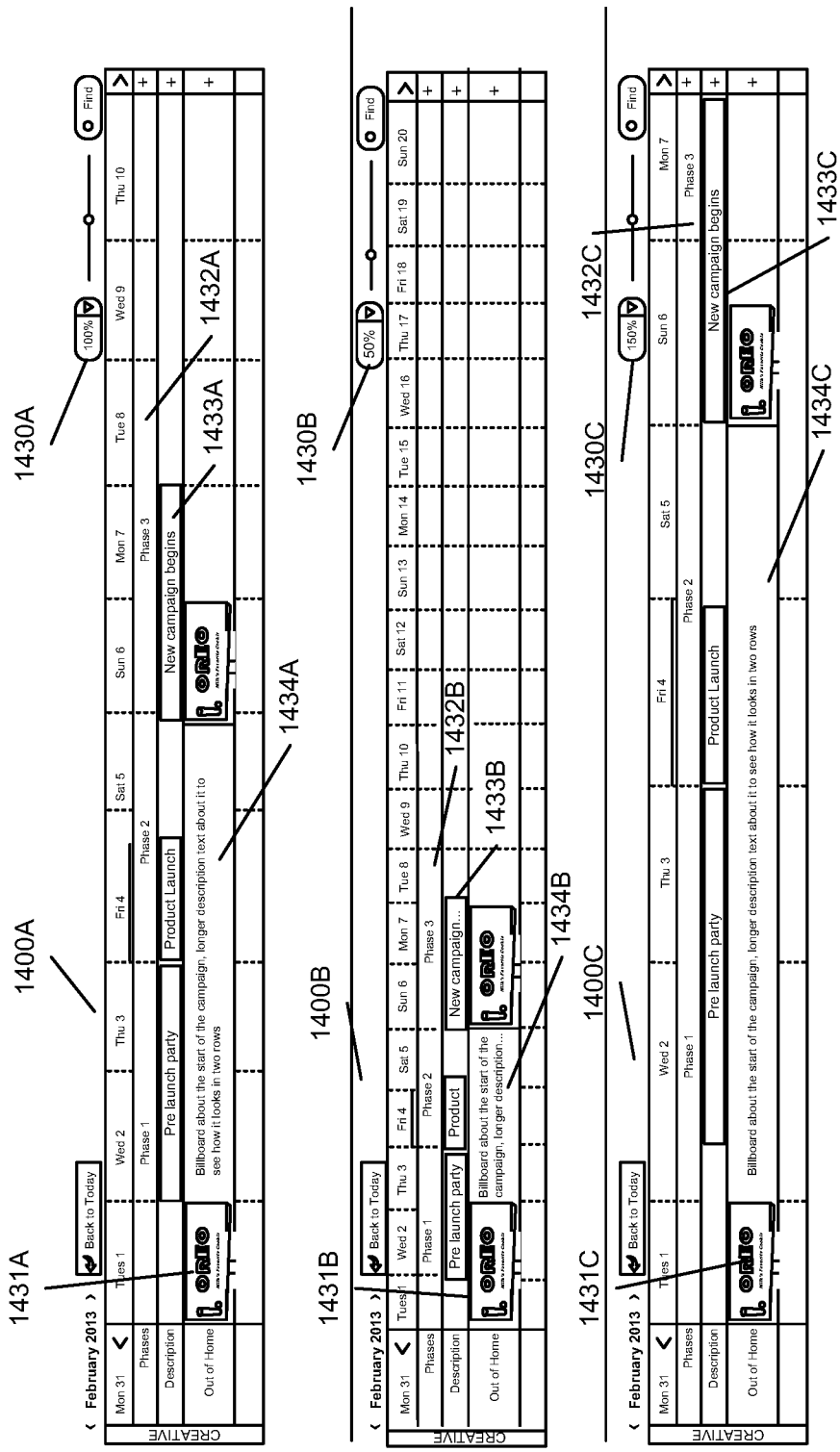

FIG. 14E shows examples of a calendar displaying the same information zoomed to three different levels 1400A, 1400B, 1400C. Zooming to different levels may be enabled through the UI via any zooming input (e.g., scrolling, selecting a level in the interface 1430, pinch and zoom for touch-screen devices, etc.). Each calendar 1400A, 1400B, 1400C in this example includes an image 1431A, 1431B, 1431C. The system 100 may store multiple images at different resolutions for use at different zoom levels. For example, in a calendar 1400 with many images shown because of a distant zoom level, lower resolution images may be used. This may reduce processor load in some embodiments. On the other hand, in a calendar 1400 with only one or a few images displayed due to a tight zoom level, higher resolution images may be used. When an image is introduced to the system 100 (e.g., by user upload during creation of a creative), the system 100 may generate copies of the image at different resolutions. For example, if a user uploads a very large, high definition image, the file size may be too large to load on a handheld device. The system 100 may create a smaller version of the image (as well as many other sizes in some embodiments) so that it may load quickly and display properly on a smaller screen. The system 100 may detect screen dimensions of the device and choose an appropriate size.

The calendars 1400A, 1400B, 1400C also include sample creative data. A creative may be divided into phases 1432A, 1432B, 1432C (e.g., phases 1-3 as shown in the example of FIG. 14E). Descriptions 1433A, 1433B, 1433C may be provided for each phase 1432A, 1432B, 1432C. Details may also be provided for each phase 1432A, 1432B, 1432C. In this example, the details include images 1431A, 1431B, 1431C and text 1434A, 1434B, 1434C describing the creative. The details may appear on the calendar 1400A, 1400B, 1400C such that they stretch across the dates during which the creative is being used (e.g., when a billboard is displayed, when a TV commercial is aired, when an Internet ad is displayed, etc.). The details may also be named by a user. For example, in FIG. 14E the creative is entitled "Out of Home" as shown.

FIG. 16 also shows a calendar 1400 example including creative data. As in FIG. 14E, phases 1432, descriptions 1433, and details 1434 are included. Note that several different sets of details 1434 are shown in this example. A campaign may include multiple facets (e.g., multiple commercials, images, billboards, text descriptions, etc.), each of which may be active during a different phase of the campaign. Each different facet may be shown in a separate row in the calendar 1400. The calendar 1400 also includes media spend data 1490. For each day, the calendar 1400 illustrates an amount spent. As discussed above, other metrics may also be shown.

Figure 14F:
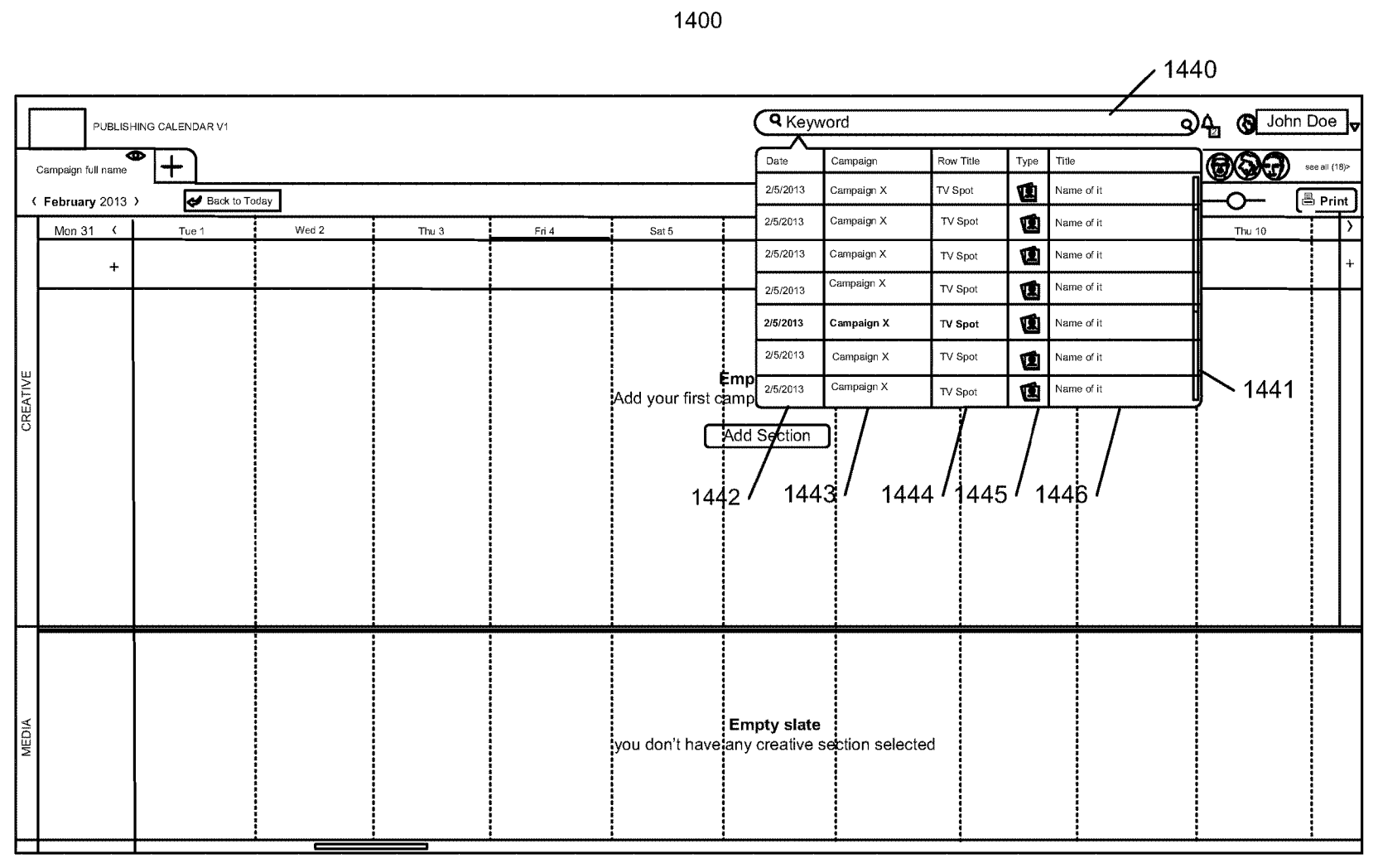

In FIG. 14F a search dialog 1440 is illustrated. Calendars 1400 may be located using the search dialog 1440 via keyword searching. Additionally, selecting and/or typing into the search dialog 1440 may cause display of a dropdown UI 1441, which may include search refinements such as, but not limited to, date 1442, campaign name 1443, row title 1444, type 1445, and title 1446.

Figure 14G:
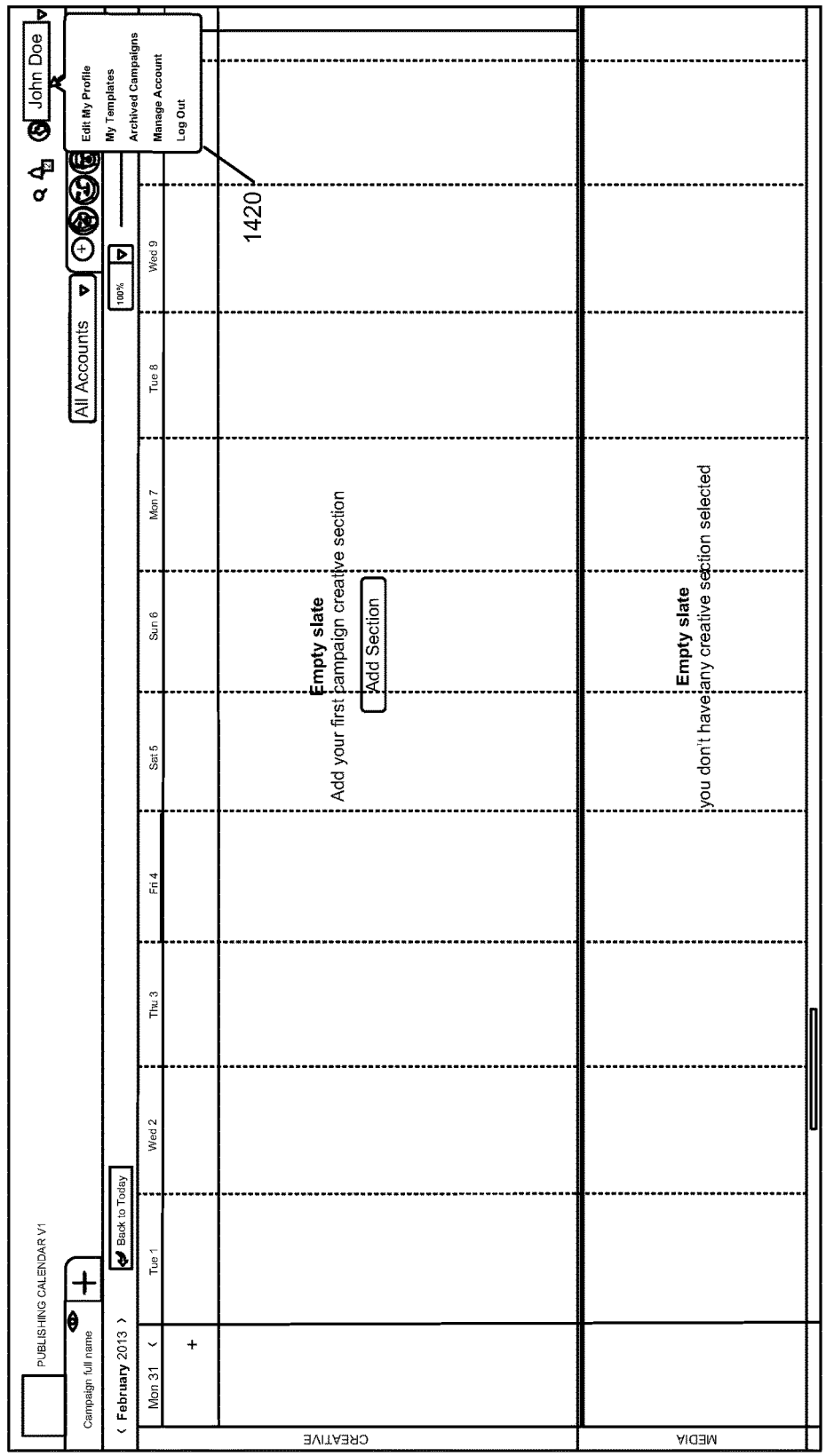

As shown in FIG. 14G, the calendar 1400 UI may allow users to view and manage profile information 1420, such as editing profile, managing account, viewing and editing templates and campaigns associated with the account, and/or logging out.

Figure 14H:
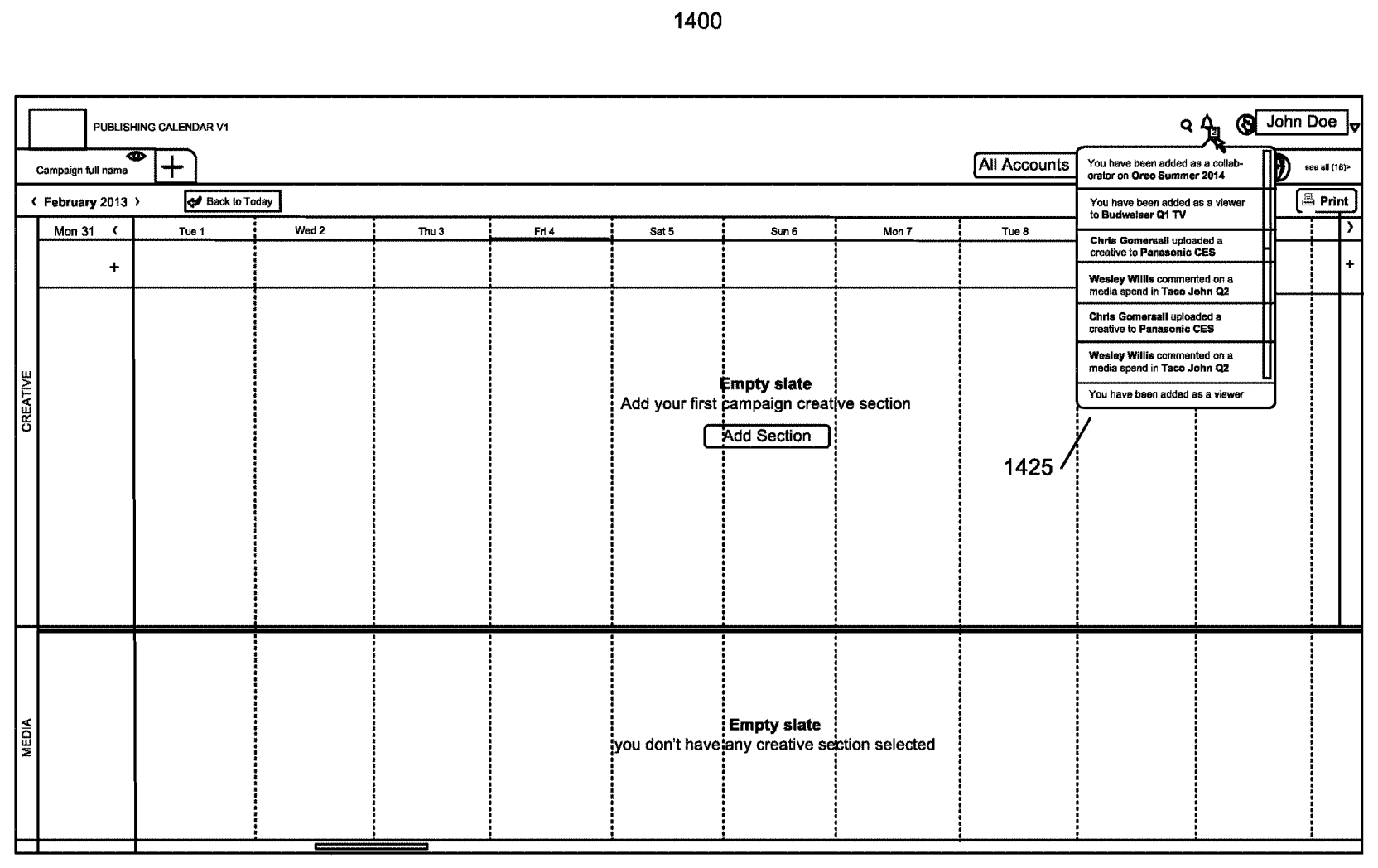

As shown in FIG. 14H, the calendar 1400 UI may allow users to view and manage notifications 1425. These calendar screenshots are further referenced in the Example Embodiments described in greater detail below.

Figure 14I:
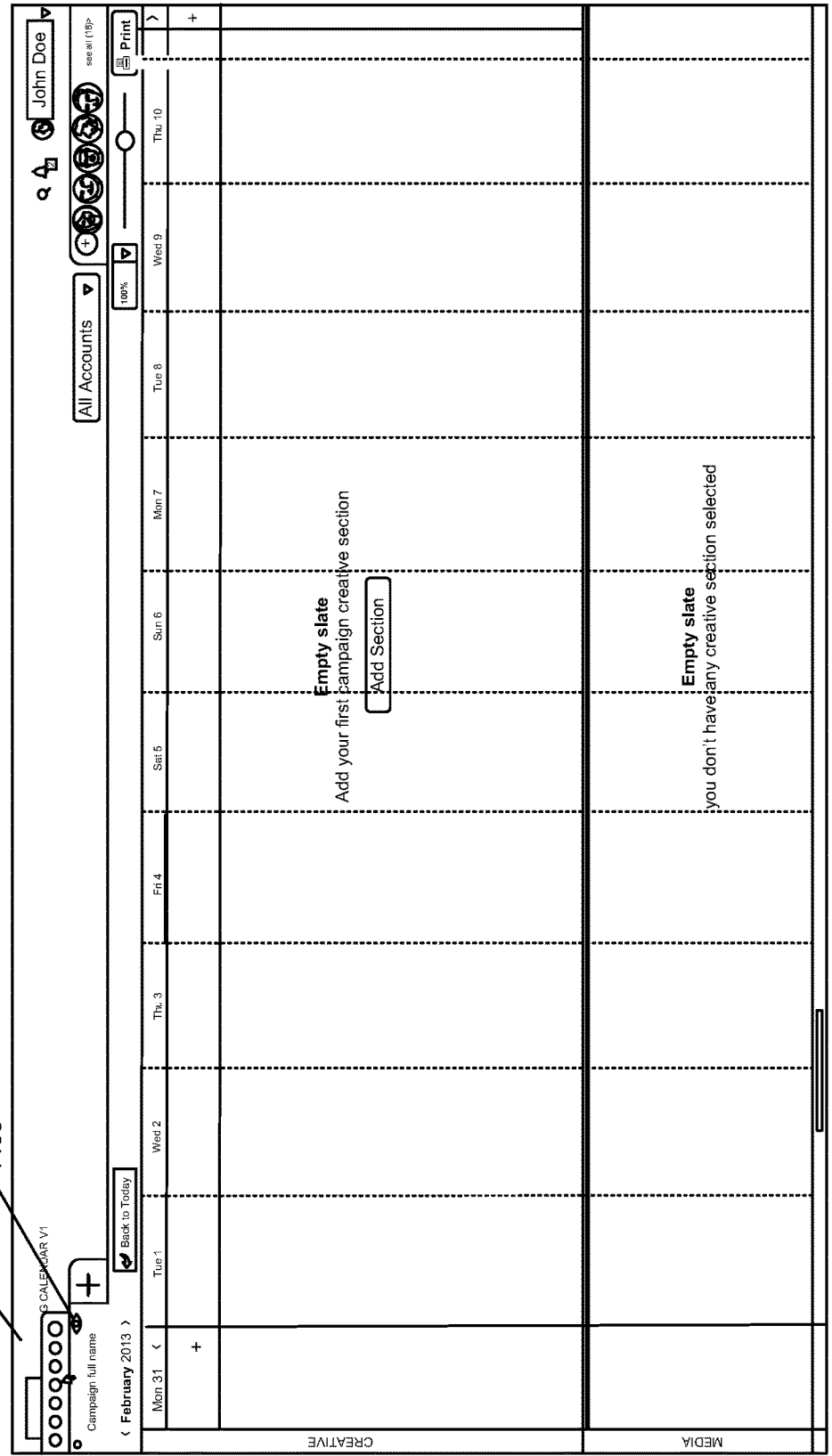

As shown in FIG. 14I, the calendar 1400 UI may allow users to change the color 1450 of a tab 1403. This may allow users to identify different calendars 1400 based on tab 1403 color.

Figure 15A:
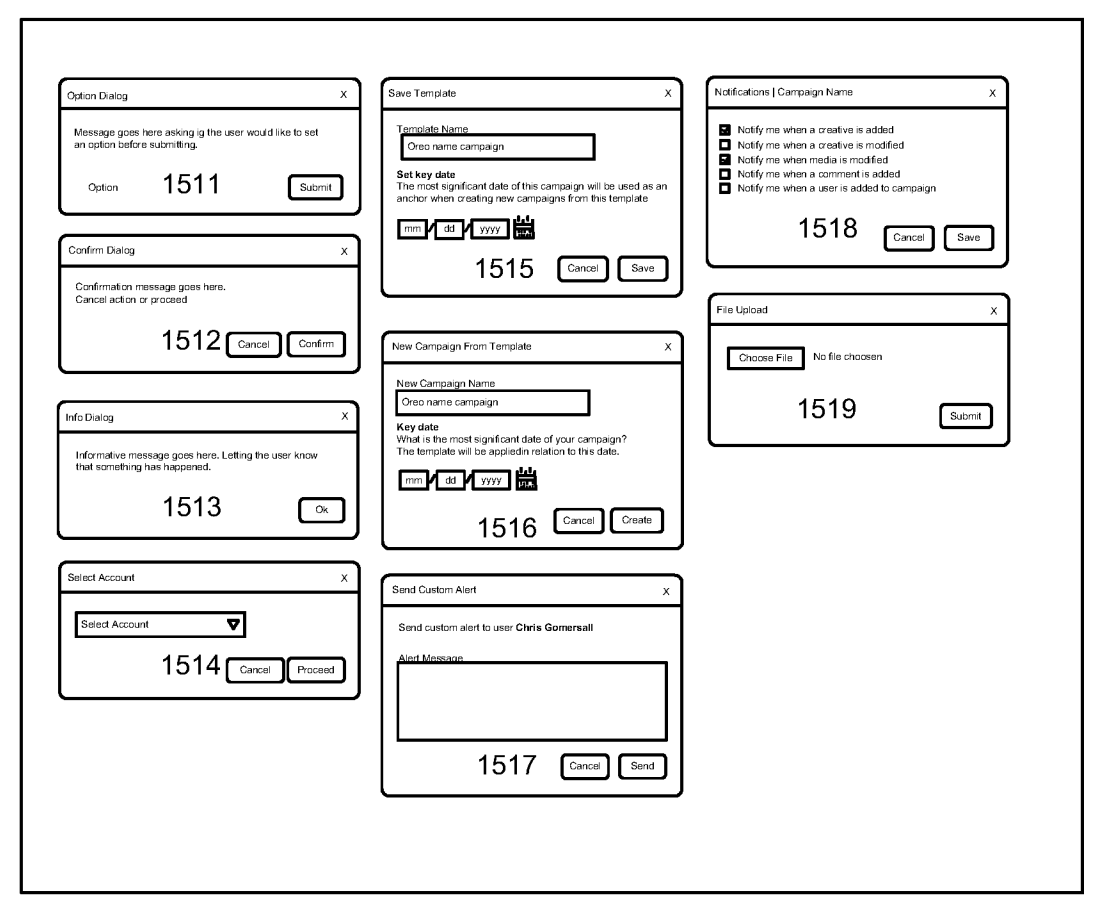
Figure 15B:
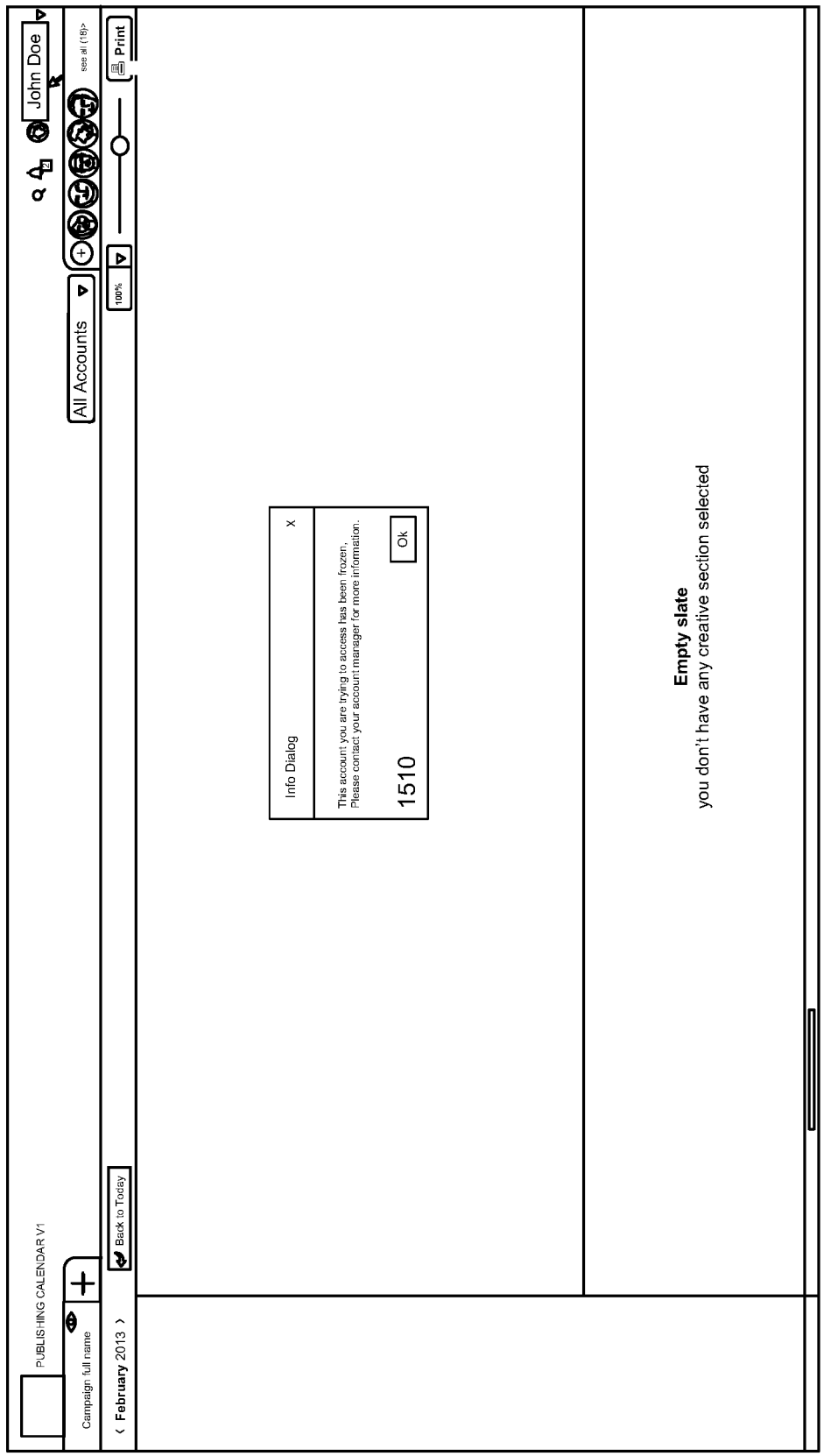
Figure 15C:
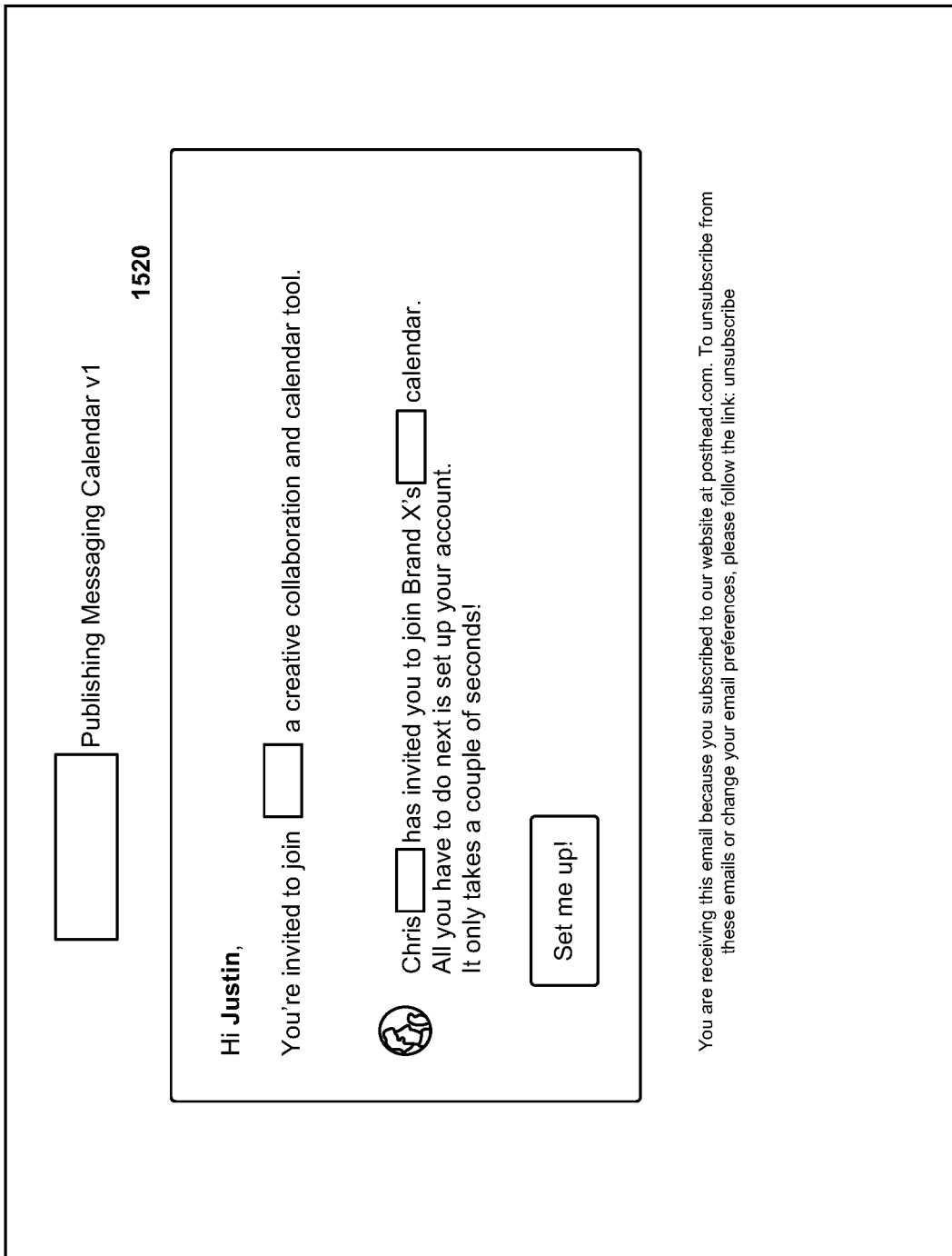

FIG. 15A shows an access control UI. A user may be able to control access to calendars using the UI. For example, a user may block a second user from accessing a calendar. In this case, when the second user tries to access the calendar, a dialog 1510 such as that shown in FIG. 15B may be displayed by the system 100. In other examples, users may receive the dialog 1510 after they try to access the software if their subscription has lapsed, after they have been removed from a campaign by an administrator, or after they have lost their internet connection. As those of ordinary skill in the art will appreciate, other dialogs may be displayed by the system 100 in other situations. FIG. 15A illustrates some sample dialogs 1511-1519. Dialogs may include, but are not limited to, option dialogs 1511, confirmation dialogs 1512, information dialogs 1513, selection dialogs 1514, template save dialogs 1515, new campaign dialogs 1516, alert generation dialogs 1517, notification dialogs 1518, and upload dialogs 1519. Note that template dialog 1515 and new campaign dialog 1516 may allow date entry so that a user can specify a relevant time or time period for the template or campaign being saved or created. Also, the alert dialog 1517 may allow a user to enter text to create a custom alert which may be sent to one or more specified users.

In another example, the user may invite a second user to a calendar. In this case, the second user may receive an invite 1520, such as that shown in FIG. 15C, and may use the invite to access the system 100 (e.g., to go to a login UI such as those described above).

Figure 15D:
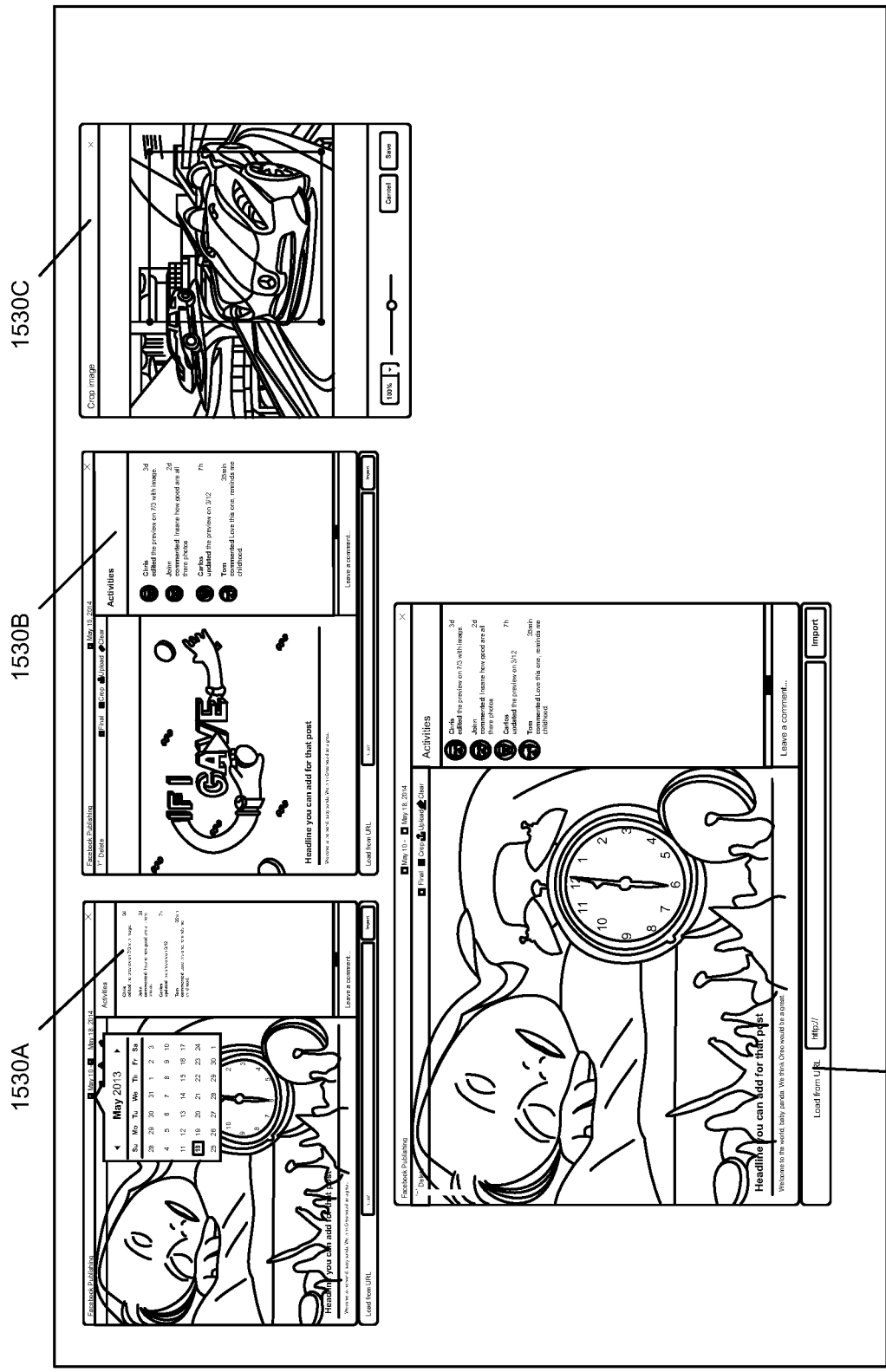
Figure 15E:
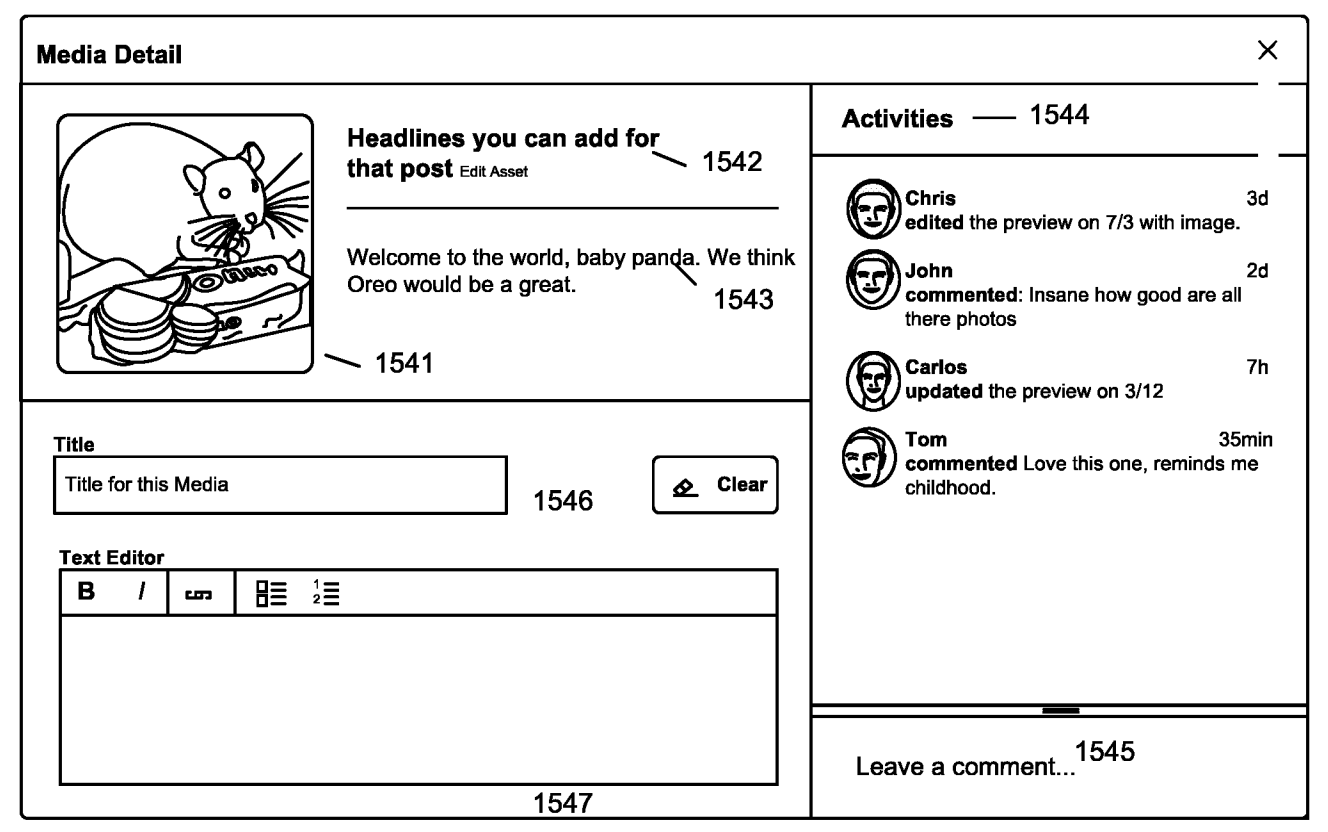
Figure 15G:
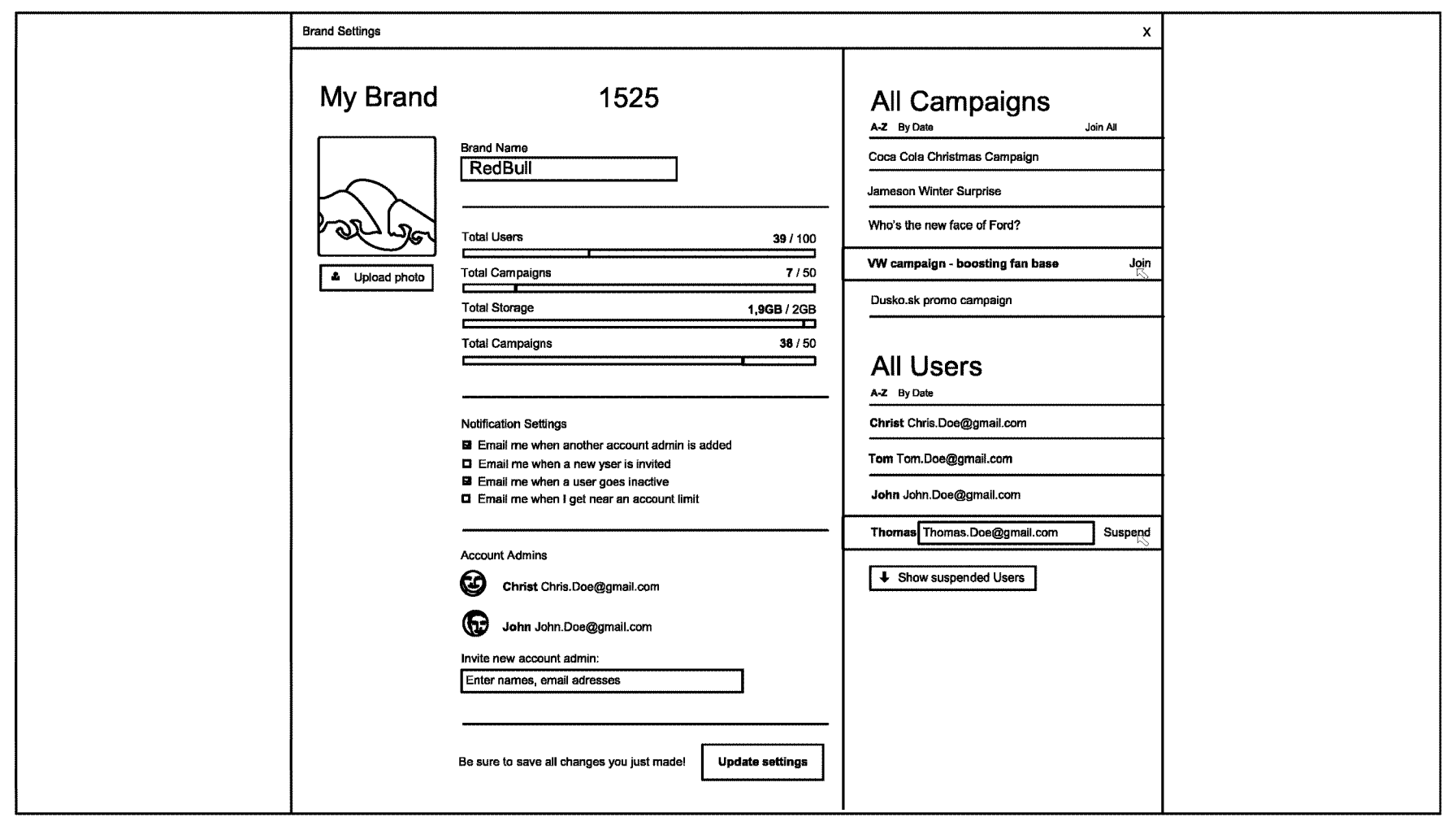
Figure 15H:
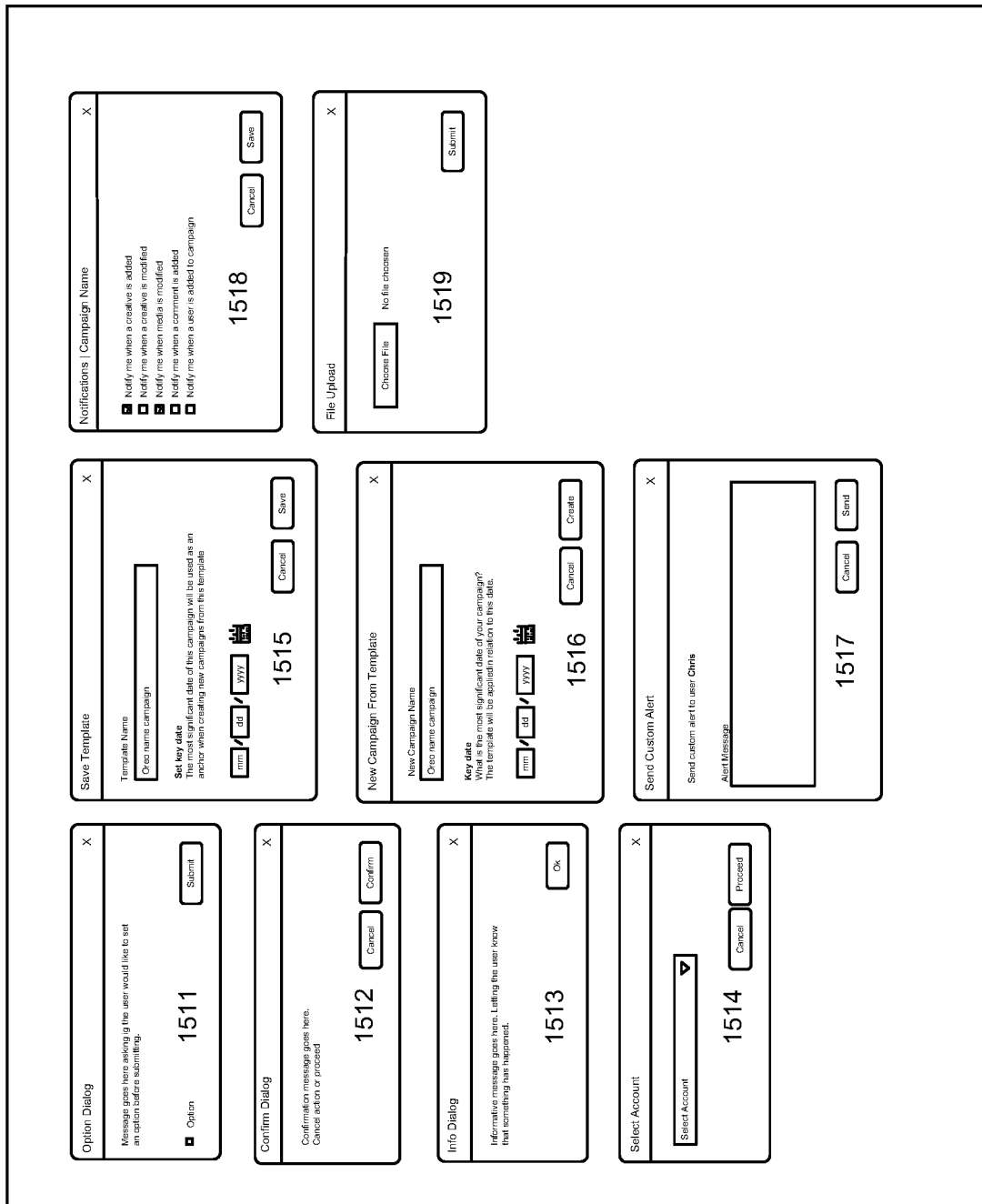

FIG. 15D provides examples of campaign detail displays 1530A, 1530B, 1530C, 1530D. In some embodiments, a user may select a calendar 1400 creative (e.g., by double clicking or otherwise selecting a phase, description, and/or detail as shown in FIG. 14E) and be presented with a detail display 1530A, 1530B, 1530C, 1530D associated with that creative. Detail displays 1530A, 1530B, 1530C, 1530D may include, but are not limited to, an identification of the creative, times and dates when the creative is active, activities and comments associated with the creative, visuals, notes, options to edit/crop/clear/delete/etc., an activity stream displaying user modification history, and/or a pre-population form for inserting data from a URL into the creative.

FIG. 15E illustrates an example of a media detail display 1540. This display 1540 may be similar to the campaign detail displays of FIG. 15D, except that a user may access it by selecting a calendar 1400 media section rather than a creative. The detail display 1540 may include, but is not limited to, a thumbnail representing the associated creative 1541 (e.g., a small copy of the ad), a title 1542, a description 1543, an activity stream displaying user modification history 1544, a comment dialog 1545, and/or a title/text editor 1546. Other information may also be displayed, such as cost associated with running the media and data such as performance metrics and analytics, for example.

FIG. 15F shows an example user profile UI 1520. The UI 1520 may allow a user to edit their personal information and view active campaigns and templates to which they have access. For example, a user may be able to edit information such as their name, company, title, contact information, location, language preference, time zone, etc. from the user profile UI 1520. The user may be able to edit notification options from the user profile UI 1520. For example, a user may choose whether they would like to be notified when different events involving them take place within the system 100 (e.g., they are added to a campaign, or a project they have worked on has been changed). The user profile UI 1520 may also show lists and/or information about campaigns and/or templates associated with the user.

FIG. 15G shows an example account UI 1525. The account UI 1525 may display information about an account (e.g., one associated with a specific brand as shown in this example), including campaigns and/or users associated with the account, for example. The account UI 1525 may display information such as a name of an account and statistics associated with the account (e.g., users associated with the account, campaigns associated with the account, storage use, etc.). A user may be able to edit notification options from the account UI 1525. For example, a user may choose whether they would like to be notified when different events associated with the account take place within the system 100 (e.g., new account admins are added, users associated with the account are added or removed, account limits such as space or total number of allowed campaigns are neared). Information about account admins may be displayed in the account UI 1525, for example contact information and/or links to admin profiles. The account UI 1525 may also show lists and/or information about campaigns and/or users associated with the account.

Example Embodiments

Scroll Right and Left to New Calendar Dates. This use case may begin when the subscriber is viewing the main calendar screen and selects to move forward or backward on the timeline. This use case may end when the subscriber has reached their desired date range and it is displayed on the screen. The subscriber may be able to transition to close calendar dates with a smooth transition animation. There may also be a feature to quickly navigate at a macro level, for instance by weeks and months.

View and Mouse Over Content. This use case may begin when the subscriber arrives at the main calendar view and rolls over various parts of the screen. This use case may end when the subscriber clicks anywhere on the screen and/or takes an action. When various rows are rolled over, they may highlight. When a row in the creative section is highlighted, the corresponding row in the media section may highlight as well, and vice versa. When a row is highlighted in the Creative Section, that row may become considerably larger and in full opacity, whereas the other rows will become smaller and transparent.

Figure 3:
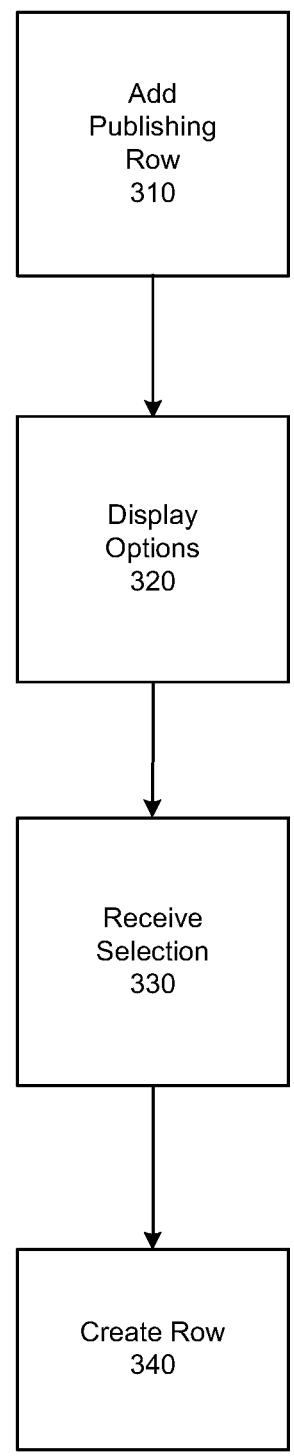
FIG. 3 is a creation process according to an embodiment of the invention.
Figure 4:
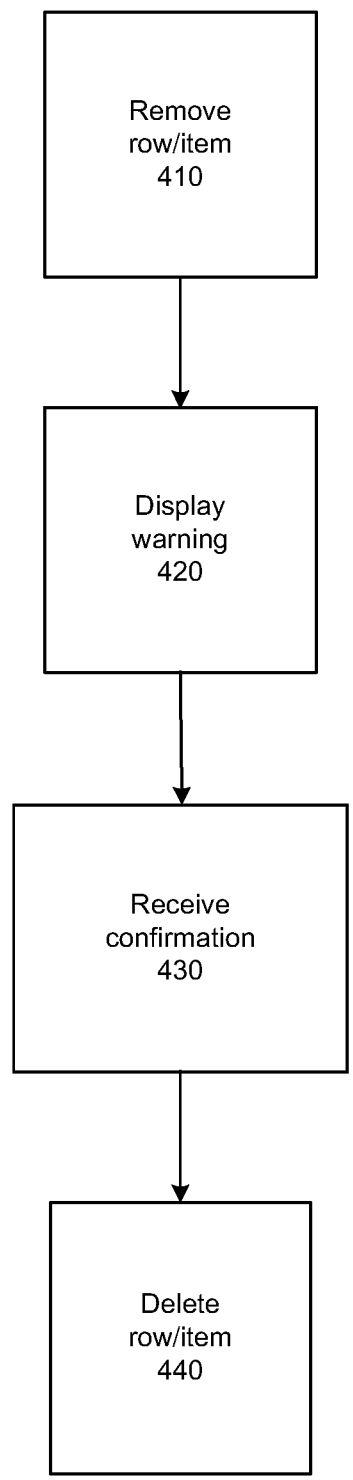
FIG. 4 is a removal process according to an embodiment of the invention.

Add Publishing Row, Remove Publishing Row, Drag Publishing Item, Remove Publishing Item. This use case may begin when a subscriber adds a publishing row (e.g., a creative row or media row in the creative section of FIG. 16), removes a publishing row, drags timeframes within the publishing row, or deletes an item within the publishing row. This use case may end when a publishing row has been created, removed, dragged, or has an item deleted. FIG. 3 provides an example 300 of adding a row. A subscriber may add a new publishing row in 310 by choosing from preselected row options displayed in 320 (e.g., using a dropdown list or other interface): Facebook, Twitter, Instagram, Tumblr, Pinterest, Google+, YouTube, TV, Print, Radio, Out Of Home, and "Other". The user may be able to change the "Other" to a custom row title through the annotate use case. In examples using a dropdown list, the list may be sorted by "most recently used". The subscriber may be able to delete an entire publishing row. FIG. 4 provides an example 400 of removing a row. In 410 the user may request to remove the row. Because of the nature of this action, the user may get a warning message in 420 (e.g., "Are you sure you want to delete this entire row? Deleting this row will remove all row items currently on screen, past and future dates, and associated media spend information."). The user may have the ability to cancel or confirm this action or otherwise send their selection to the system 110 in 330/430. When a publishing row is removed, a corresponding media row may be automatically removed. A user may be able to drag a specific publishing item to visually extend its date on the timeline. A user may be able remove individual items from a publishing row (e.g., by right clicking). Touch screen and gesture users may do this through the launch upload window use case. The user's created row(s) may be generated/deleted in 340/440 and added to/removed from a calendar 1400.

Figure 5:
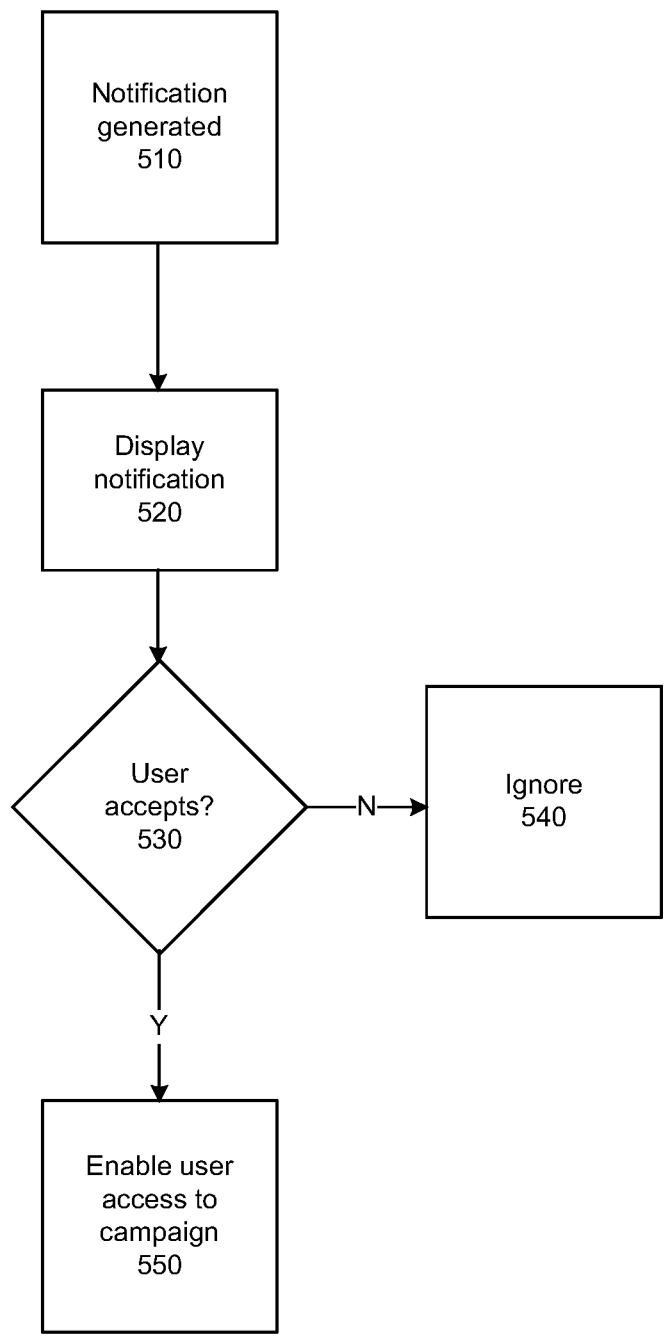
FIG. 5 is a notification process according to an embodiment of the invention.
Figure 10:
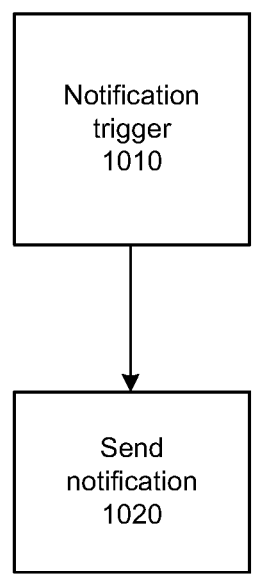
FIG. 10 is a notification process according to an embodiment of the invention.

View Notifications. This use case may begin when the subscriber receives a push notification or an email from the system 100. This use case may end when the subscriber accesses the system 100 via the alert and views the appropriate landing page. FIG. 5 presents an example notification generation 500. When a subscriber is invited to join a campaign, a notification may be generated in 510, the invitation may show up in notifications in 520, and the subscriber may choose to "ignore" in 540 or "join campaign" in 530, for example. If the user joins, the system 100 may provide user access to the campaign in 550. When the subscriber receives a push notification that new content is available, the system 100 may support launching the app from the notification. Upon launch and successful login, the post-login landing page may be displayed. When the subscriber receives an email notification that new content is available, the system 100 may support launching the system 100 web site from the email. Upon launch, the landing page with login form may be displayed. The subscriber may be unable to access content without authentication via login. When the subscriber receives an email notification from a collaborator, the system 100 may support launching the system 100 web site from the email. Upon launch, the landing page with login form may be displayed. FIG. 10 shows an example notification process 1000. A notification may be triggered in 1010, for example in any of the situations described above. In 1020, the system 100 may push the notification to the user to whom it is directed.

Add Important Date, Remove Important Date, Drag Important Date. An important date may be a date identified by a user as relating to a specific event. This use case may begin when the subscriber adds, removes, or drags an important date on the important dates row. This use case may end when dates are added, removed, or dragged into position. The subscriber may be able to click on a day within the important dates row. When the subscriber has clicked to add an important date, the cursor may automatically populate so the subscriber can type to name the important date, spawning the annotate use case. The subscriber may be able to remove an important date. The subscriber may be able to drag the important dates to span multiple days.

Figure 7:
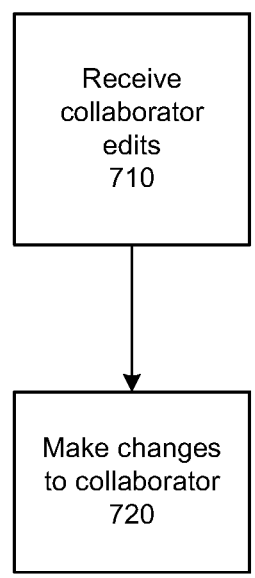
FIG. 7 is an editing process according to an embodiment of the invention.

Manage Campaign Members. This use case may begin when the subscriber selects to manage campaign members. This use case may end when the subscriber submits the changes, and the system 100 sends notifications to the campaign editors. The subscriber may see a list of all collaborators. Editors may be identified on the list (e.g., graphically). The collaborators in the list may be selectable. FIG. 7 shows an example process 700 for making changes to members. A subscriber may make changes to a collaborator (e.g., user type, access permissions, etc.), and in 710 the system 100 may receive the changes. In 720, the system 100 may enact the changes to the member's profile. The system 100 may support the ability for a subscriber to allow collaborators to become editors. The system 100 may support the ability for an editor to toggle editor status of collaborators. Non-editors may be able to request editor status, which may cause the system 100 to deliver the request to one or more editors. The subscriber creating the campaign may automatically be made an editor and may remain editor at least until there is another editor appointed. Each campaign may have a minimum of one editor. The system 100 may support the ability for the subscriber who created a campaign (or other editors in some embodiments) to modify the campaign to add and remove members. If an email address is changed, the system 100 may assume this is a new member. Upon saving the changes, the system 100 may send emails or other notifications to new group members. The email may contain a link to the system 100 website landing page for account creation and login. FIG. 15A shows an example UI 1505 which may provide these features.

Figure 6:
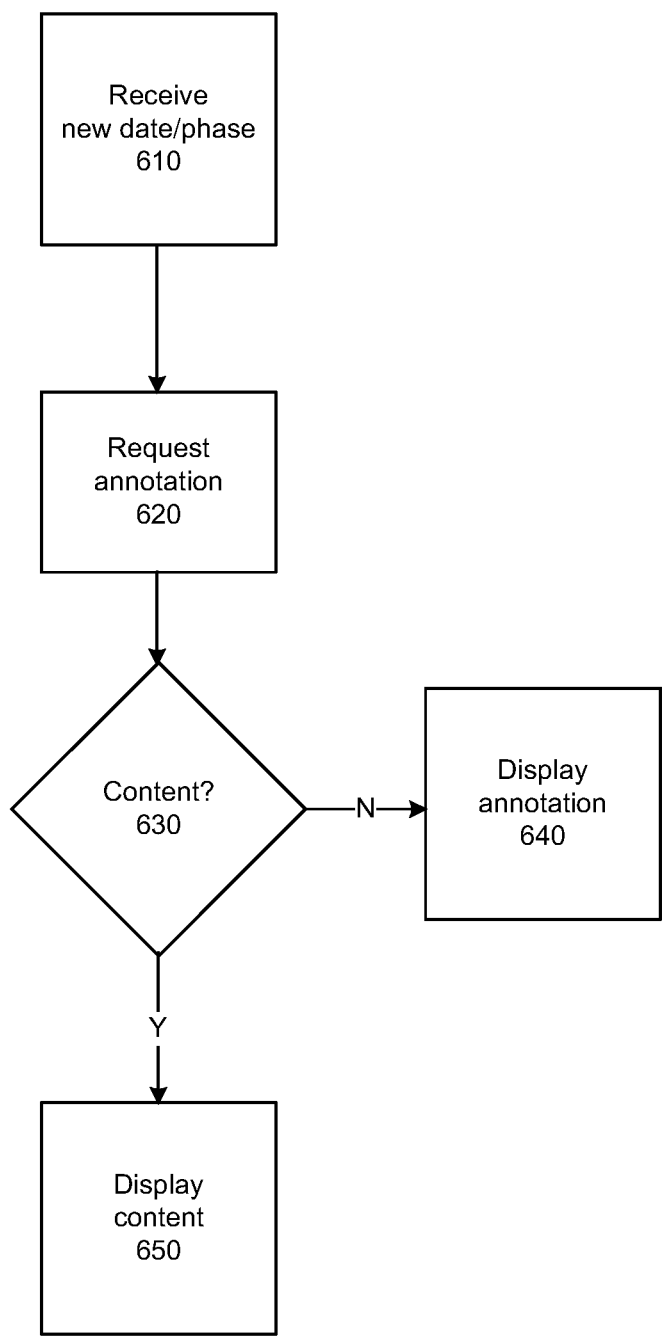
FIG. 6 is an annotation process according to an embodiment of the invention.

Annotate. This use case may begin when the subscriber clicks any item on the calendar timeline. This use case may end when the subscriber types what they want and then "enter" or click out of the type box or otherwise submit the data. FIG. 6 provides an example 600 of adding a new annotation. The system 100 may receive the new information in 610. If an annotation is requested in 620, the system 100 may determine whether there is content available 630. Cells within the calendar rows may allow annotations. If content is uploaded to the system, it may receive priority over annotations in 650. For instance, if Tuesday has an annotation on it and then a subscriber uploads an image, the annotation may not be visible over the image. If there is no content, annotations may be displayed in 640.

Add Campaign. This use case may begin when the subscriber selects to add a new campaign. This use case may end when a new campaign has been created and appears on the subscriber's main calendar view. The subscriber may add a blank campaign, for example in the form of a blank calendar template with only the dates pre-populated. The blank campaign may be given a default name, and the campaign calendar may default to the current date. The subscriber may add a new campaign by choosing from a list of preselected row options (e.g., TV Show Premiere, Movie Premiere, Automotive Launch, Product Launch, etc., as well as any templates created as described below). See FIG. 14B for an example add campaign UI. This list may be editable by the system 100 curator. Once a campaign template has been selected, a calendar tab may be created with a respective pre-populated template, which may be uploaded by the system 100 curator. The subscriber may also be able to create a new template based on their current campaign. The subscriber may name and save the template and use it in the future to create campaigns. These templates may only show up for the subscriber who created them. See FIG. 14C for an example save template UI. Subscribers may be able to edit and delete templates. A subscriber may also be able to add an example campaign by choosing from a list of preselected row options (e.g., Oreo, New Castle Brown Ale, Ford Mustang, etc.). This list may be editable by the system 100 curator. Once an example campaign template has been selected, a calendar tab may be created with respective pre-populated template, which may be uploaded by the system 100 curator. Calendar view may default to earliest content in the example campaign.

Figure 8:
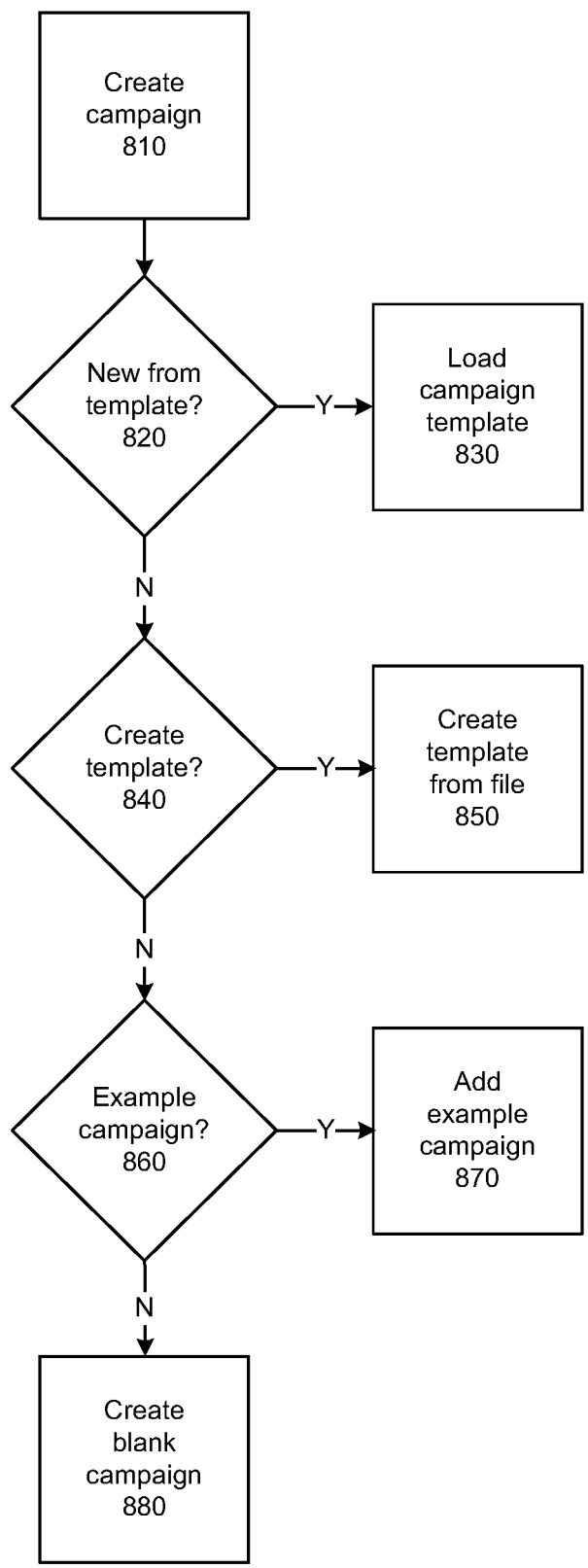
FIG. 8 is a campaign creation process according to an embodiment of the invention.

FIG. 8 provides an example addition of a campaign 800. In 810 the system 100 may begin creating a campaign. If the campaign is new from a template in 820, the calendar module 110 may load the campaign template in 830. If the campaign is to be a new template in 840, the calendar module 110 may create a template in 850. If the campaign is an example campaign in 860, the calendar module 110 may add an example campaign in 870. If none of the above options apply, in 880 the calendar module 110 may create a blank campaign.

Add Phase, Remove Phase, Drag Phase. A phase may be a group of related dates identified by the user, as shown in FIG. 16 for example. This use case may begin when the subscriber adds, removes, or drags a phase on the phase row. This use case may end when phases are added, removed, or dragged into position. The subscriber may be able to select a day within the phase row. When the subscriber has chosen to add a phase, a cursor may automatically populate so a subscriber can type to name the phase, spawning the annotate use case. The subscriber may be able to remove a phase. The subscriber may be able to drag the phases to span multiple days, weeks etc.

Figure 9:
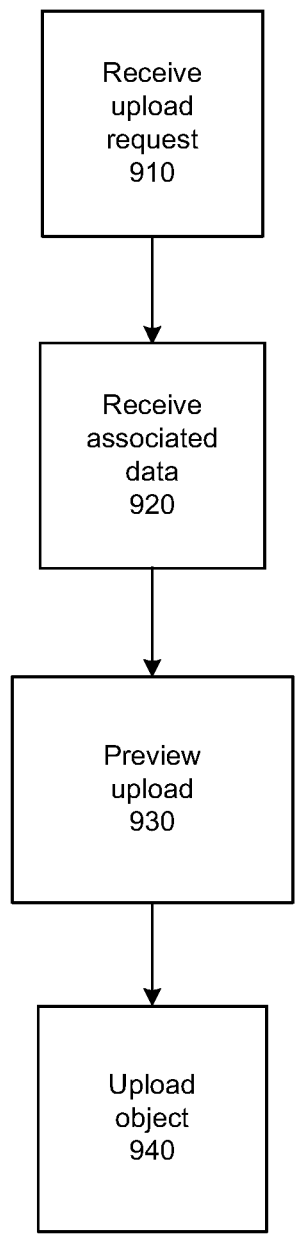
FIG. 9 is an upload process according to an embodiment of the invention.

Launch Upload Window. This use case may begin when the subscriber adds an item by dragging and dropping files into a publishing row, selecting an existing item in the publishing row, or selecting a blank cell in the publishing row, and the upload window is open. The use case may end when the subscriber makes changes to the upload window items, those changes are automatically persisted to the system 100, and subscriber closes or clicks out of the window. FIG. 9 presents an example upload 900. The system 100 may receive an upload request in 910. Any item added in a drag and drop scenario may populate in the upload window. Each upload window may contain information about the last time it was updated. For instance "Uploaded by [Subscriber Name] on [date]" or "Edited by [Subscriber Name] on [date]." Changes may be automatically saved as they happen. A subscriber may be able to populate the title field with text, choose a date range, add text to the text box (which may represent the native type that will accompany images on social networks, a legible version of small type on a print add, a television script, etc.), interact with comments, view images, and/or upload and delete items. A subscriber may be able to see a list of comments associated with the content. For example, comments may be sorted by date, newest first, or in some other way. Each comment may contain the name of the person who submitted it, their profile picture, their comment, and the date and time it was created, other information that may be useful, or a combination thereof. In 920 the subscriber generated data may be received 920. In 930 the Subscriber may be able to see a preview of the content that has been uploaded. If the content is an image or video, it may be cropped to accurately preview how it will look within the calendar. If the content is a video, there may be full playback capability for preview purposes. If the content is text, audio, or something that cannot be displayed, then an icon may be displayed that represents the content. A subscriber may be able to click a button and launch a finder window on their device that may allow for a content upload. The new item that is uploaded may replace the current image preview, if applicable. A subscriber may be able to delete the item, in some cases after viewing a warning and consenting. In 940, the data may be uploaded to the system 100.

Email System Customer Support. This use case may begin when the subscriber selects to email customer support. This use case may end when the subscriber submits the email or exits the function without sending the email. The subscriber may be able to email support from within the system 100 interface.

Toggle Campaign Tab Visibility. This use case may begin when the subscriber selects to show or hide a campaign tab, or navigates to another tab. This use case may end when the subscriber can see the desired campaign(s) displayed in front of them. A subscriber may be able to display multiple campaigns at once if they choose by clicking on a "show" or "hide" icon on the tab, for example. A subscriber may be able to navigate between campaigns.

Zoom. This use case may begin when the subscriber uses pinch and zoom motions on a touch screen or clicks the zoom function to zoom in or out or otherwise zooms. This use case may end when the subscriber can see the desired date range displayed in front of them Print. This use case may begin when the subscriber selects the print option. This use case may end when the subscriber has printed pages of his/her campaign(s). The print feature may offer the ability to print in some or all of the following ways, and/or in other ways:

Print all pages from all campaigns
Print all pages from current campaign
Print all pages from visible campaigns
Print pages with changes today
Print pages with changes this week
Print pages with changes this month Drag Media Spend Bars. This use case may begin when the subscriber drags the media spend bars (e.g., up and down). This use case may end when the subscriber has finished dragging. A subscriber may have the ability to drag the individual days in the media section to indicate how the media dollars are being spent against the creative publishing row days.

Provide Example Content to Subscribers. This use case may begin when the system 100 is triggered to display example content for subscribers. The trigger events may include, but are not limited to, the following:

The subscriber has chosen to add a new campaign from a template
The subscriber has chosen to display an example campaign This use case may end when the system 100 has displayed a new campaign tab for the subscriber to view. Example campaigns and templates may be uploaded by the system 100 curator.

Send Notifications. This use case may begin when the system 100 is triggered to notify the subscriber. The notification may be triggered by a variety of events, for example:

Notifying an editor that a collaborator has been added
Notifying an editor that a subscriber has asked to become an editor
Notifying a subscriber that they have become an editor
Invitations to join campaigns
Notifying someone that they have been added to a campaign This use case may end when the system 100 sends an alert notification to the subscriber. Notifications may be delivered according to the subscriber's configured preference (e.g., either email or push notification). If a member is not yet a subscriber, the notification may be sent by email, and the member may be required to create an account to view the calendar. When a subscription (trial or purchased) is nearing expiration, and the subscriber has opted for auto-renewal, the system 100 may send a notification, such as an email notification. FIG. 14H illustrates an example notification management UI.

Figure 11:
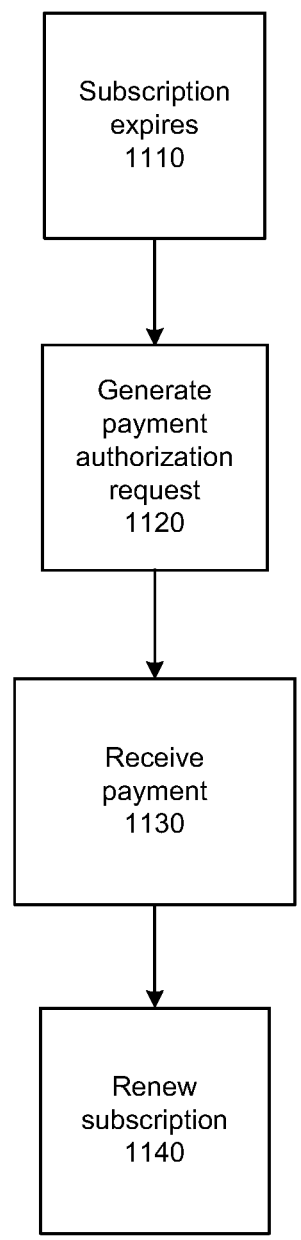
FIG. 11 is a subscription process according to an embodiment of the invention.

Auto-renew Subscriptions. This use case may begin when a date has been reached on which subscriber's subscription has expired if the Subscriber has opted for auto-renewal. This use case may end when a payment is successfully processed. FIG. 11 presents an example subscription renewal 1100. Where a subscriber has opted for auto-renewal of a subscription, upon expiration of the last subscription period in 1110, the system 100 may submit a payment authorization request for the amount of the new subscription period in 1120. The payment may be for the base subscription and for the duration configured in the subscriber's profile. When the authorization is accepted in 1130, the system 100 may renew the subscription for the duration selected by the subscriber in their account profile in 1140.

Manage Example Campaigns. This use case may begin when the curator has accessed the system 100 content repository for the purpose of adding, editing, or removing example campaigns. This use case may end when the curator has added, edited, or removed example campaigns. The curator may be able to add new content to the content repository.

Manage New Campaign Templates. This use case may begin when the curator has accessed the system 100 content repository for the purpose of adding, editing, or removing campaign templates. This use case may end when the curator has added, edited, or removed campaign templates. The curator may be able to add new content to the content repository.

Set up Promo for Trial Subscriptions. This use case may begin when the marketing administrator accesses the function in the system 100 where trial subscription promotions are defined. This use case may end when the marketing administrator saves the new trial subscription promotion. The marketing administrator may be able to persist trial subscription promotion codes and associated PMD codes to the system 100.

Figure 12:
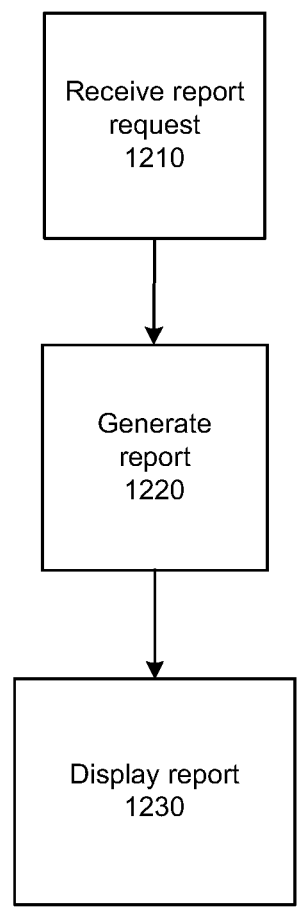
FIG. 12 is a reporting process according to an embodiment of the invention.

Run Reports. This use case may begin when the marketing administrator selects to run a report. This use case may end when the marketing administrator is viewing the report results. FIG. 12 shows an example report process 1200. In 1210, the system 100 may receive a report request. In 1220, the system 110 may generate the report. In 1230, the system 110 may display the report. The marketing administrator may be able to run reports for internal and external use. Reports may include, but are not limited to:

Monthly active users
Campaign viewing statistics
Trial subscription conversions to base or premium subscriptions by PMD
Activated trial subscriptions by PMD
Accounts payable—amounts due to PMDs
Subscriber demographic
Refunded subscription
Auto-renewals Assist User Account Recovery. The customer support user may be able to assist subscribers with accounts. Where the subscriber has forgotten the email address they used to set up the account, the customer support user may be able to assist, for example.

Extend Free Trial Subscriptions. This use case may begin when a subscriber contacts the customer support user and requests an extension of a free trial subscription. The use case may end when the customer support user extends the free trial subscription. The customer support user may be able to extend free trial subscriptions as requested by a subscriber. Extensions may be in standard increments (e.g., one month, one year, etc.). The system 100 may record an instance of an extension and date the extension was made and may allow for a note to be entered regarding the subscriber's account.

Example Use Cases

Advertising Formats: Advertising agencies may use the system 100 to compare creative assets for their various brand clients. For example, use cases may involve comparing different formats for advertising like print, TV, out of home, digital, social, etc. as they are launched at different times on different platforms.

Photography: Photographers or photography studios may use the system 100 to compare different photographic prints before they are displayed in a gallery or online (e.g., on a blog, website, social network, etc.).

Designs: Designers creating different patterns, logos, models, digital assets, crafts, etc. may use the system 100 to compare how their designs look in different settings, on different products, with different lighting, etc. and control when the designs are released.

Sketches: Anyone using a traditional method of sketching an idea on paper, white board, canvas, napkins, etc. may use the system 100 to organize their ideas and visually compare them on screen, along with when the ideas may be moved into the next phase of development.

Videos: Anyone creating videos may upload their videos to the system 100 and see how different video styles compare with one another as well as see when the video may be released to the public in the calendar.

Fine Art: Artists creating drawings, paintings, sculpture, installations, etc. from various materials may use the system 100 to compare their art and control when it may be released to the public.

Museums/Galleries: Curators or managers may use the system 100 to review what goes on the museum walls and when, as well as when exhibits are added or taken down.

Fabric: Fabric manufacturers my use the system 100 to compare various patterns on rolls of fabric to see which fabrics are in production, and when.

Computer Aided Drawings: Anyone using a computer to design a product may output various stages of development and use the system 100 to compare how fast things are being created and keep track of their progress throughout production.

Automotive: Manufacturers may use the system 100 to compare various models of cars, planes, motorcycles, etc. and their development stages from concepts to marketing to exhibition at various auto shows to release.

Clothing/Apparel Design: Companies that design clothing and apparel may use the system 100 to decide which pieces may be released at which times by visual comparison.

Clothing/Apparel Display: Companies that sell clothing/apparel in virtual or physical stores may use the system 100 to compare which items are sold at which times.

Industrial Designs: Companies or individuals that create products for use or display may use the system 100 to compare various stages or use cases of the products they create. For example, different shapes or colors of a created object can be compared for user testing and usability and/or aesthetics.

Property Management: People that own multiple building units or land lots may use the system 100 to compare photographs and graphics representing their property, when it needs inspection, when it was bought, when it was sold, etc.

Building Construction Management: Companies or individuals that build/construct units may use the system 100 to monitor various stages of development.

Real Estate Speculation: Investors looking to purchase real estate may use the system 100 to compare various land plots, building units, drawings, maps, etc. and see when they became available, were sold, are scheduled to be built or remodeled, etc.

Interior Design: Interior Designers may use the system 100 to visually compare matching colors, styles, decorations, furniture, etc. as they relate to the rooms and houses for which they are designing.

Architectural Designs: Architects may use the system 100 to compare inspirational features, current projects, various stages of designs, etc. for their projects.

Handwriting: Calligraphers and other occupations involving writing words by hand may use the system 100 to evolve their writing abilities, design new fonts, explore different versions of their writing, etc.

Source Files: Any person using a software program to develop or explore files may use the system 100 to preview different files for different days so they know which files may be associated with which day/week/year etc.

Consumer Packaged Goods: Companies developing products for distribution and sale within a physical or virtual store may use the system 100 to compare various packaging, labels, boxes, blister packs, signage, etc. so they can see which products are releasing at which times and how they visually compare to each other.

Pharmaceutical: Companies manufacturing drugs for commercial and private distribution may use the system 100 to compare labels, warnings, disclaimers, side effects, litigation flags, etc., as well as when these things might happen.

Software Development: Companies or individuals creating software may use the system 100 to compare screenshots, features, tutorials, etc. related to their product at various stages of development.

Entertainment: Companies creating movies, television shows, video games, concerts, etc. may use the system 100 to compare various assets such as actor head shots, bios, posters, trailers, previews, behind the scenes clips, video extras, inspirational photography, set design, character sculptures, 3D assets, scenery, location photos, storyboards, etc. at various stages of development.

Facial Representations: Anyone needing to compare faces may use the system 100 to visualize teams, lists, groups, contacts, clients, co-workers, members, employees, organizations, etc. For example, the police department may want to feature the America's Most Wanted list, including when people are highlighted, added, or removed from the list.

Projections: Anyone using an illuminating device to project an image may use the system 100 to compare projections, hardware, surfaces, bulb variations, etc.

Food Industry: Farmers, processors, manufacturers, distributors, restaurant owners, etc. may use the system 100 to compare diagrams and/or photographs of seed variations, menu items, plate configurations, kitchen hardware, etc. along with when and where they might be used.

Virtual Reality: The system 100 may be used inside of a virtual reality program to compare assets that may not exist outside of the program. For instance, if there are new assets to be created inside a virtual world, the system 100 may be used to plan when and where the assets may be created and placed.

Publishers: Publishers of magazines, books, ebooks, newspapers, and various media may use the system 100 to compare content within their publications, as well as various publications under one umbrella company. For example a magazine may use this software to compare pages and sections within the magazine, while the parent company may use the software to compare cover shots from the magazine with other magazines it publishes, etc.

Collections: Collectors may use the system 100 to display their collections, mark when new pieces are being released, when they bought or sold items in their collection, etc.

Government: Government officials or employees may use the system 100 to compare and monitor different types of units within various government branches or military organizations. For instance, various tabs of the software could display uniforms, vehicles, weapons, currency, etc. as well as when and why they are being altered, added, or deprecated.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

In addition, the terms "comprising", "including", etc. signify "including, but not limited to" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:
1. A method comprising:
receiving, at a first computer, using a management module in communication with a processor, a plurality of creative elements, each creative element comprising at least one of an image, graphics, an audio recording, or video;
receiving, with the management module, a chosen time period of interest for the creative elements;
detecting, with the management module, screen dimensions of a second computer in communication with the management module;
generating, with the management module, multiple copies of each of the plurality of creative elements, each copy having a different resolution and file size;
selecting, with the management module, one of the multiple copies of each creative element for display on the second computer, the selecting comprising choosing a copy of each creative element having at least one of a first resolution or a second resolution displayable on the second computer based on the screen dimensions;
simultaneously displaying on the second computer, in a size corresponding to the screen dimensions of the second computer, in a visually layered timeline format on a calendar corresponding to the chosen time period of interest, the copy of each creative element together on a user interface screen of the second computer, enabling the copy of each creative element to be reviewed and compared to each other in the calendar on the user interface screen for the chosen time period of interest;

loading a first copy of a particular creative element from among the plurality of creative elements, at the first resolution according to a first zoom level on the user interface screen of the second computer while a user is zooming the first copy of the particular creative element; and loading a second copy of the particular creative element from among the plurality of creative elements, at the second resolution according to a second zoom level on the user interface screen of the second computer while the user is zooming the second copy of the particular creative element.

2. The method of claim 1, further comprising:

displaying, at the second computer, the first copy of the particular creative element at the first resolution according to the first zoom level; and displaying, at the second computer, the second copy of the particular creative element at the second resolution according to the second zoom level.

3. The method of claim 1, further comprising transmitting, with the management module, a total file comprising the copy of each creative element, to the second computer, wherein the total file comprises a minimum file size for the copy of each creative element minimized through omission of creative elements having resolutions that are too large to display on the second computer based on the screen dimensions.

4. The method of claim 1, further comprising displaying, on the calendar, a single list of dates horizontally, and displaying under each date all creative elements shown on that date listed in a column under that date.

5. The method of claim 1, wherein the first computer and the second computer are a same computer.

6. The method of claim 1, wherein the plurality of creative elements comprise art elements associated with one or more art displays.

7. The method of claim 1, wherein the plurality of creative elements comprise at least one of:

product elements associated with one or more physical products; or visual elements associated with one or more physical properties; or a combination thereof.

8. The method of claim 1, wherein the plurality of creative elements comprise at least one of:

software elements associated with one or more software products; or visual elements associated with one or more facial databases; or visual elements associated with one or more publications; or design elements associated with one or more inventories; or a combination thereof.

9. The method of claim 1, further comprising:

displaying on the second computer, a first subset of creative elements from among the plurality of creative elements associated with a campaign, at the first resolution according to the first zoom level on the user interface screen on a first calendar corresponding to a first chosen time period of interest; and simultaneously displaying on the second computer, a second subset of creative elements from among the plurality of creative elements associated with the campaign, at the second resolution according to the second zoom level on the user interface screen on a second calendar separate from the first calendar corresponding to a second chosen time period of interest.

* * * * *